United States Patent
Bach et al.

(10) Patent No.: US 11,210,086 B2
(45) Date of Patent: *Dec. 28, 2021

(54) MANAGING PARAMETER SETS

(71) Applicant: Ab Initio Technology LLC, Lexington, MA (US)

(72) Inventors: Edward Bach, Melrose, MA (US); Richard Oberdorf, Portland, ME (US); Brond Larson, Sharon, MA (US)

(73) Assignee: Ab Initio Technology LLC, Lexington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/389,148

(22) Filed: Apr. 19, 2019

(65) Prior Publication Data

US 2019/0243639 A1    Aug. 8, 2019

Related U.S. Application Data

(63) Continuation of application No. 14/803,374, filed on Jul. 20, 2015, now Pat. No. 10,318,283.
(Continued)

(51) Int. Cl.
*G06F 8/70* (2018.01)
*G06F 9/54* (2006.01)
(Continued)

(52) U.S. Cl.
CPC ............... *G06F 8/70* (2013.01); *G06F 8/10* (2013.01); *G06F 8/34* (2013.01); *G06F 9/4494* (2018.02);
(Continued)

(58) Field of Classification Search
CPC ..... G06F 8/10; G06F 8/34; G06F 8/70; G06F 8/71; G06F 9/4494; G06F 9/54;
(Continued)

(56) References Cited

U.S. PATENT DOCUMENTS 5,630,127 A    5/1997    Moore et al.
5,758,351 A    5/1998    Gibson et al.
(Continued)

FOREIGN PATENT DOCUMENTS

CN    101535955        9/2009
CN    102656554 A      9/2012
(Continued)

OTHER PUBLICATIONS

Chaiken et al., "Scope: easy and efficient parallel processing of massive data sets," J. Proc. of the VLDB Endowment Hompagearchive, vol. 1, No. 2, (2008), pp. 1265-1276.
(Continued)

*Primary Examiner* — S. Sough
*Assistant Examiner* — Stephen D Berman
(74) *Attorney, Agent, or Firm* — Occhiuti & Rohlicek LLP

(57) ABSTRACT

Managing sets of parameter values includes: receiving a plurality of sets of parameter values for a generic computer program, and processing log entries associated with executions of instances of the generic computer program, each instance associated with one or more parameter values. The processing includes: analyzing the generic computer program to classify each of one or more parameters associated with the generic computer program as a member of either a first class or a second class; processing a log entry associated with an execution of a first instance of the generic computer program to form a particular set of parameter values; and determining whether to add the particular set of parameter values to the plurality of sets of parameter values based on a comparison of a first identifier for the particular set of parameter values to identifiers for at least some of the sets of parameter values.

31 Claims, 12 Drawing Sheets

Related U.S. Application Data

(60) Provisional application No. 62/026,228, filed on Jul. 18, 2014.

(51) Int. Cl.

| | | |
|---|---|---|
| *G06F 16/28* | (2019.01) | |
| *G06F 16/22* | (2019.01) | |
| *G06F 16/23* | (2019.01) | |
| *G06F 16/901* | (2019.01) | |
| *G06F 8/10* | (2018.01) | |
| *G06F 8/34* | (2018.01) | |
| *G06F 9/448* | (2018.01) | |
| *G06F 11/34* | (2006.01) | |
| *G06F 16/00* | (2019.01) | |
| *G06F 16/17* | (2019.01) | |
| *G06F 16/11* | (2019.01) | |
| *G06F 16/178* | (2019.01) | |

(52) U.S. Cl.
CPC ............ *G06F 9/54* (2013.01); *G06F 11/3476* (2013.01); *G06F 16/00* (2019.01); *G06F 16/11* (2019.01); *G06F 16/116* (2019.01); *G06F 16/119* (2019.01); *G06F 16/17* (2019.01); *G06F 16/178* (2019.01); *G06F 16/2282* (2019.01); *G06F 16/2379* (2019.01); *G06F 16/285* (2019.01); *G06F 16/9024* (2019.01)

(58) Field of Classification Search
CPC .. G06F 11/3476; G06F 16/17; G06F 16/2379; G06F 16/285; G06F 16/2282; G06F 16/119; G06F 16/178; G06F 16/00; G06F 16/9024; G06F 16/11
See application file for complete search history.

(56) References Cited

U.S. PATENT DOCUMENTS

| | | | |
|---|---|---|---|
| 5,966,072 A | 10/1999 | Stanfill et al. | |
| 6,088,702 A | 7/2000 | Plantz et al. | |
| 6,381,735 B1 | 4/2002 | Hunt | |
| 6,494,159 B2 | 12/2002 | Sirmalis et al. | |
| 6,496,835 B2 | 12/2002 | Liu et al. | |
| 6,625,499 B2 | 9/2003 | Abdalla | |
| 6,633,875 B2 | 10/2003 | Brady | |
| 6,708,186 B1 | 3/2004 | Claborn et al. | |
| 6,820,077 B2 | 11/2004 | Godfredsen et al. | |
| 6,832,366 B2 | 12/2004 | Kouznetsov et al. | |
| 6,868,526 B2 | 3/2005 | Singh | |
| 6,948,154 B1 | 9/2005 | Rothermel et al. | |
| 7,031,001 B2 | 4/2006 | Nakagiri et al. | |
| 7,054,885 B1 * | 5/2006 | Hoffman | G06F 8/71 |
| 7,080,088 B1 | 7/2006 | Lau | |
| 7,099,885 B2 | 8/2006 | Hellman et al. | |
| 7,110,924 B2 | 9/2006 | Prewett et al. | |
| 7,143,076 B2 | 11/2006 | Weinberg et al. | |
| 7,164,422 B1 | 1/2007 | Wholey, III et al. | |
| 7,167,850 B2 | 1/2007 | Stanfill | |
| 7,185,317 B2 | 2/2007 | Fish et al. | |
| 7,242,406 B2 | 7/2007 | Robotham et al. | |
| 7,249,151 B2 | 7/2007 | Cesare et al. | |
| 7,257,603 B2 | 8/2007 | Murman et al. | |
| 7,328,428 B2 | 2/2008 | Baugher | |
| 7,353,227 B2 | 4/2008 | Wu | |
| 7,428,486 B1 | 9/2008 | Casati et al. | |
| 7,428,846 B2 | 9/2008 | Vukovic | |
| 7,464,105 B2 | 12/2008 | Smith | |
| 7,506,314 B2 | 3/2009 | Kollmann et al. | |
| 7,536,406 B2 | 5/2009 | Haselden et al. | |
| 7,574,652 B2 | 8/2009 | Lennon et al. | |
| 7,603,368 B2 | 10/2009 | Super et al. | |
| 7,614,036 B2 | 11/2009 | Bjornson et al. | |
| 7,647,298 B2 | 1/2010 | Adya et al. | |
| 7,661,067 B2 | 2/2010 | Chen et al. | |
| 7,689,565 B1 | 3/2010 | Gandhi et al. | |
| 7,690,000 B2 | 3/2010 | Farmer | |
| 7,716,630 B2 | 5/2010 | Wholey et al. | |
| 7,761,586 B2 | 7/2010 | Olenick et al. | |
| 7,765,529 B1 | 7/2010 | Singh et al. | |
| 7,797,319 B2 | 9/2010 | Piedmonte | |
| 7,802,728 B2 | 9/2010 | Kisliakov | |
| 7,805,474 B2 | 9/2010 | Warshavsky et al. | |
| 7,840,949 B2 | 11/2010 | Schumacher et al. | |
| 7,853,553 B2 | 12/2010 | Lankinen et al. | |
| 7,860,863 B2 | 12/2010 | Bar-Or et al. | |
| 7,865,507 B2 | 1/2011 | Naimat et al. | |
| 7,870,162 B2 | 1/2011 | Paul et al. | |
| 7,870,556 B2 | 1/2011 | Wholey, III et al. | |
| 7,890,509 B1 | 2/2011 | Pearcy et al. | |
| 7,895,586 B2 | 2/2011 | Ozone | |
| 7,899,833 B2 | 3/2011 | Stevens et al. | |
| 7,912,264 B2 | 3/2011 | Freiburger et al. | |
| 7,913,233 B2 | 3/2011 | Kumar | |
| 7,937,415 B2 | 5/2011 | Ducaule et al. | |
| 7,970,746 B2 | 6/2011 | Seshadri et al. | |
| 7,979,646 B2 | 7/2011 | Furtek et al. | |
| 8,032,404 B2 | 10/2011 | Lee et al. | |
| 8,060,821 B2 | 11/2011 | Seymour et al. | |
| 8,069,129 B2 | 11/2011 | Gould et al. | |
| 8,082,228 B2 | 12/2011 | Mu | |
| 8,103,704 B2 | 1/2012 | Abrams | |
| 8,165,853 B2 | 4/2012 | Pinto et al. | |
| 8,255,363 B2 | 8/2012 | Johnson et al. | |
| 8,321,433 B1 | 11/2012 | Klinker et al. | |
| 8,423,564 B1 | 4/2013 | Hayes | |
| 8,429,619 B2 | 4/2013 | Albert et al. | |
| 8,433,733 B2 * | 4/2013 | Sayed | G06F 9/542 707/821 |
| 8,478,706 B2 | 7/2013 | Gould | |
| 8,484,159 B2 | 7/2013 | Stanfill et al. | |
| 8,516,008 B1 | 8/2013 | Marquardt et al. | |
| 8,555,265 B2 | 10/2013 | Chambers et al. | |
| 8,566,296 B2 | 10/2013 | Yalamanchi | |
| 8,572,236 B2 | 10/2013 | Sherb et al. | |
| 8,572,551 B2 | 10/2013 | Feger et al. | |
| 8,583,664 B2 | 11/2013 | Weir et al. | |
| 8,630,917 B2 | 1/2014 | Belanger et al. | |
| 8,694,518 B2 | 4/2014 | Schultz et al. | |
| 8,718,978 B2 | 5/2014 | Parker et al. | |
| 8,732,143 B2 | 5/2014 | Falkebo et al. | |
| 8,768,877 B2 | 7/2014 | Bhatia et al. | |
| 8,825,695 B2 | 9/2014 | Studer et al. | |
| 8,862,563 B2 | 10/2014 | Sivashanmugam et al. | |
| 8,868,577 B2 | 10/2014 | Wei et al. | |
| 8,868,580 B2 | 10/2014 | Joel et al. | |
| 8,893,091 B2 | 11/2014 | Prateek | |
| 8,935,702 B2 | 1/2015 | Harris et al. | |
| 8,949,166 B2 | 2/2015 | Nelke et al. | |
| 8,954,482 B2 | 2/2015 | Stanfill et al. | |
| 8,954,923 B2 | 2/2015 | Satyanarayanan | |
| 8,954,981 B2 | 2/2015 | Harris et al. | |
| 9,063,998 B2 | 6/2015 | Kozina et al. | |
| 9,092,639 B2 | 7/2015 | Winters et al. | |
| 9,110,967 B2 | 8/2015 | Halberstadt | |
| 9,171,283 B2 | 10/2015 | Curbera et al. | |
| 9,286,334 B2 | 3/2016 | Velasco | |
| 9,311,221 B2 | 4/2016 | Wood et al. | |
| 9,317,624 B2 | 4/2016 | Perkins et al. | |
| 9,367,586 B2 | 6/2016 | Hans et al. | |
| 9,418,095 B2 | 8/2016 | Gould et al. | |
| 9,430,552 B2 | 8/2016 | Adya et al. | |
| 9,547,638 B2 | 1/2017 | Studer et al. | |
| 9,659,042 B2 | 5/2017 | Puri et al. | |
| 9,760,612 B2 | 9/2017 | Brainerd et al. | |
| 10,078,579 B1 | 9/2018 | Joshi et al. | |
| 2004/0024740 A1 | 2/2004 | McGeorge | |
| 2004/0088318 A1 | 5/2004 | Brady | |
| 2004/0225632 A1 | 11/2004 | Benson et al. | |
| 2005/0010896 A1 | 1/2005 | Meliksetian et al. | |
| 2005/0060317 A1 | 3/2005 | Lott et al. | |
| 2005/0076237 A1 * | 4/2005 | Cohen | G06F 9/468 726/4 |

(56) References Cited

U.S. PATENT DOCUMENTS

| | | |
|---|---|---|
| 2005/0144189 A1 | 6/2005 | Edwards et al. |
| 2005/0187984 A1 | 8/2005 | Chen |
| 2006/0007464 A1 | 1/2006 | Percey |
| 2006/0130050 A1* | 6/2006 | Betts .................. G06F 9/44505 717/171 |
| 2007/0050750 A1 | 3/2007 | Bykov et al. |
| 2007/0080088 A1 | 4/2007 | Trotter et al. |
| 2007/0094060 A1 | 4/2007 | Apps et al. |
| 2007/0179956 A1 | 8/2007 | Whitmyer, Jr. |
| 2007/0294119 A1 | 12/2007 | Eicher et al. |
| 2008/0040388 A1* | 2/2008 | Petri .................. G06F 16/1734 |
| 2008/0059942 A1* | 3/2008 | Brown .................. G06F 8/24 717/101 |
| 2008/0098365 A1* | 4/2008 | Kumar .................. G06F 11/3409 717/131 |
| 2008/0126988 A1 | 5/2008 | Mudaliar |
| 2008/0147675 A1* | 6/2008 | Engehausen ............... G06F 8/60 |
| 2008/0162384 A1 | 7/2008 | Kleist et al. |
| 2008/0229274 A1 | 9/2008 | Cacenco et al. |
| 2008/0243772 A1 | 10/2008 | Fuxman et al. |
| 2008/0288234 A1 | 11/2008 | Nelson et al. |
| 2009/0013312 A1* | 1/2009 | Albert .................. G06F 11/3636 717/128 |
| 2009/0172006 A1 | 7/2009 | Ducaule et al. |
| 2009/0187881 A1 | 7/2009 | Feger et al. |
| 2009/0234623 A1 | 9/2009 | Germain et al. |
| 2009/0319494 A1 | 12/2009 | Gooder |
| 2010/0138388 A1 | 6/2010 | Wakeling et al. |
| 2010/0145914 A1 | 6/2010 | Kanno et al. |
| 2010/0223218 A1 | 9/2010 | Prendergast |
| 2010/0293365 A1* | 11/2010 | Tandon .................. A63F 13/10 713/2 |
| 2011/0016347 A1* | 1/2011 | Brodeur ............... G06F 11/3476 714/2 |
| 2011/0066602 A1* | 3/2011 | Studer ................. G06F 17/2264 707/690 |
| 2011/0145297 A1 | 6/2011 | Singh |
| 2011/0153667 A1 | 6/2011 | Parmenter et al. |
| 2011/0282851 A1 | 11/2011 | Sivashanmugam et al. |
| 2011/0321001 A1* | 12/2011 | Dutta ..................... G06F 8/75 717/105 |
| 2012/0102029 A1 | 4/2012 | Larson et al. |
| 2012/0221293 A1 | 8/2012 | Parker et al. |
| 2012/0284287 A1* | 11/2012 | Klinker ................ G06Q 10/067 707/754 |
| 2013/0007719 A1* | 1/2013 | Goel .................. G06F 11/3636 717/128 |
| 2013/0018858 A1* | 1/2013 | Velasco .................. G06F 16/40 707/694 |
| 2013/0018873 A1 | 1/2013 | Velasco |
| 2013/0166515 A1 | 6/2013 | Kung et al. |
| 2013/0179405 A1 | 7/2013 | Alan et al. |
| 2013/0318492 A1 | 11/2013 | Satyanarayanan |
| 2013/0332423 A1 | 12/2013 | Puri et al. |
| 2014/0108357 A1 | 4/2014 | Procops et al. |
| 2014/0114905 A1 | 4/2014 | Kozina et al. |
| 2015/0127466 A1 | 5/2015 | Zhu et al. |
| 2016/0019057 A1 | 1/2016 | Bach et al. |
| 2016/0350107 A1* | 12/2016 | Bragg, Jr. .................. G06F 8/71 |

FOREIGN PATENT DOCUMENTS

| | | |
|---|---|---|
| CN | 102279087 | 11/2012 |
| CN | 103745319 | 4/2014 |
| CN | 105118019 A | 12/2015 |
| EP | 1328904 | 7/2003 |
| EP | 2221733 | 8/2010 |
| JP | H05507376 | 10/1993 |
| JP | H07044368 | 2/1995 |
| JP | 11143755 | 5/1999 |
| JP | 2002279147 | 9/2002 |
| JP | 2006277624 | 10/2006 |
| JP | 2008547134 | 1/2007 |
| JP | 2008524671 | 7/2008 |
| JP | 2015-095065 | 5/2015 |
| WO | 20100056867 | 5/2010 |
| WO | 20100065511 | 6/2010 |
| WO | 2016101883 A1 | 6/2016 |

OTHER PUBLICATIONS

Harkins, Susan "Use Excel's Conditional Formatting to Find Errors" TechRepublic, pp. 1-3, Feb. 16, 2008.

Liskin, Miriam "Microsoft Access 97 for Windows SuperGuide" Ziff-Davis Press, Jan. 1, 1997, ch. 4 & 15, pp. 117-157 and 687-739.

Melia, Mark et al., "Constraint-Based Validation of Adaptive e-Learning Courseware," IEEE Transactions on Learning Technologies, vol. 2, No. 1, Jan.-Mar. 2009, pp. 37-49.

Missier, Paolo, Norman W. Paton, and Khalid Belhajjame. "Fine-grained and efficient lineage querying of collection-based workflow provenance." University of Mancherster, Manchester, United Kingdom; pp. 299-310 (2010).

Pinheiro et al., "Mobile agents for aggregation of network management data," Published in Agent Systems and Applications, (1999) and Third International Symposium on Mobile Agents, Proceedings, First International Symposium, 1999, pp. 130-140.

Rull, Guillem et al., "MVT: A Schema Mapping Validation Tool," EDBT'09, Mar. 24-26, 2009, pp. 1120-1123.

Van Megen, Rudolf et al., "Costs and benefits of early defect detection: experiences from developing client server and host applications." Software Quality Journal 4, 247-256 (1995).

Webjørnsen, Roselie Bandibas. "Discovering data lineage in data warehouse: methods and techniques for tracing the origins of data in data-warehouse." Master's thesis, 2005.

Woodruff, A., and M. Stonebraker. "Supporting Fine-Grained Data Lineage in a Database Visualization Environment." Computer Science (1997).

Yingwei Cui et al., "Tracing the lineage of view data in a warehousing environment," 2000 [retrieved on Dec. 19, 2018], ACM Transactions on Database Systems (TODS), vol. 25, Issue 2, pp. 179-227, downloaded from the Internet at <url>:https://dl.acm.org. (Year: 2000).

Allison Woodruff et al., "Supporting fine-grained data lineage in a database visualization environment," 1997 [retrieved an Dec. 19, 2018], Proceedings 13th International Conference on Data Engineering, pp. 91-102, downloaded from the internet at <url>:https://ieeexplore.ieee.org. (Year: 1997).

Hao Fan et al., "Using Schema Transformation Pathways for Data Lineage Tracing," 2005 [retrieved on Dec. 19, 2018], British National Conference on Databases, Enterprise, Skills and Innovation, pp. 133-144, downloaded from the Internet at <url>:https://link.springer.com. (Year: 2005).

\* cited by examiner

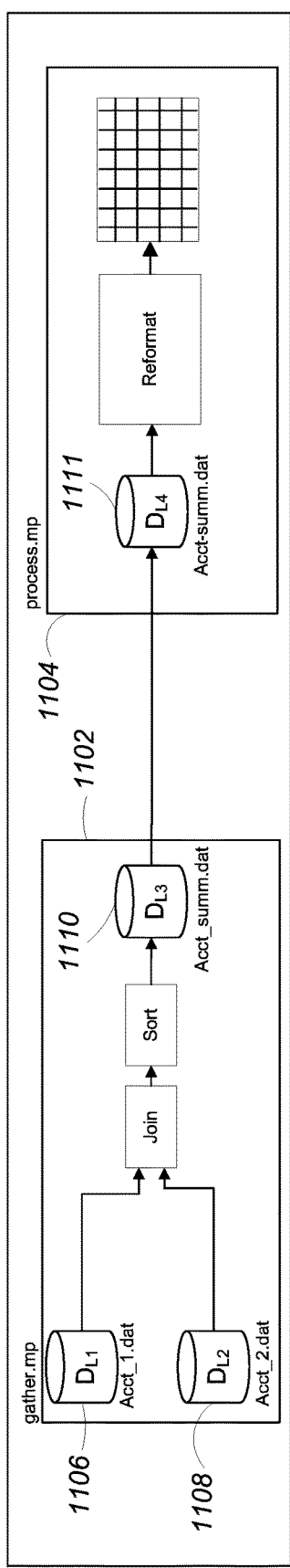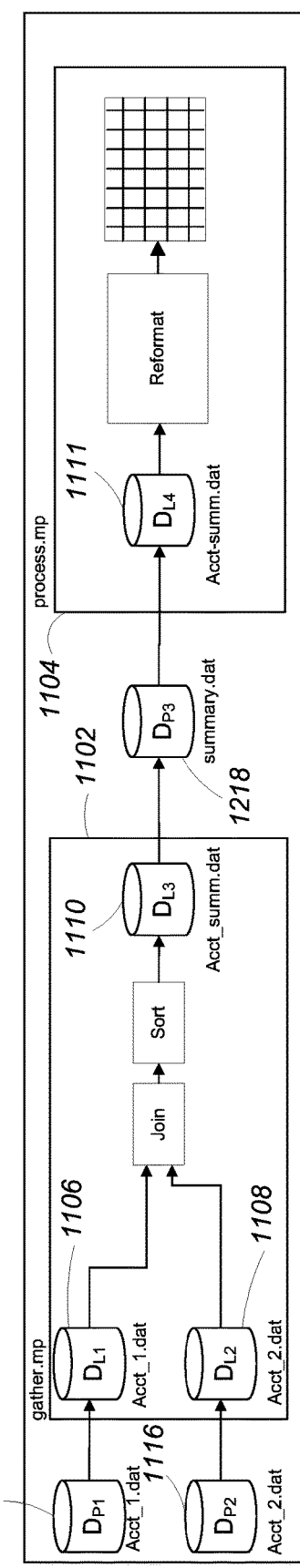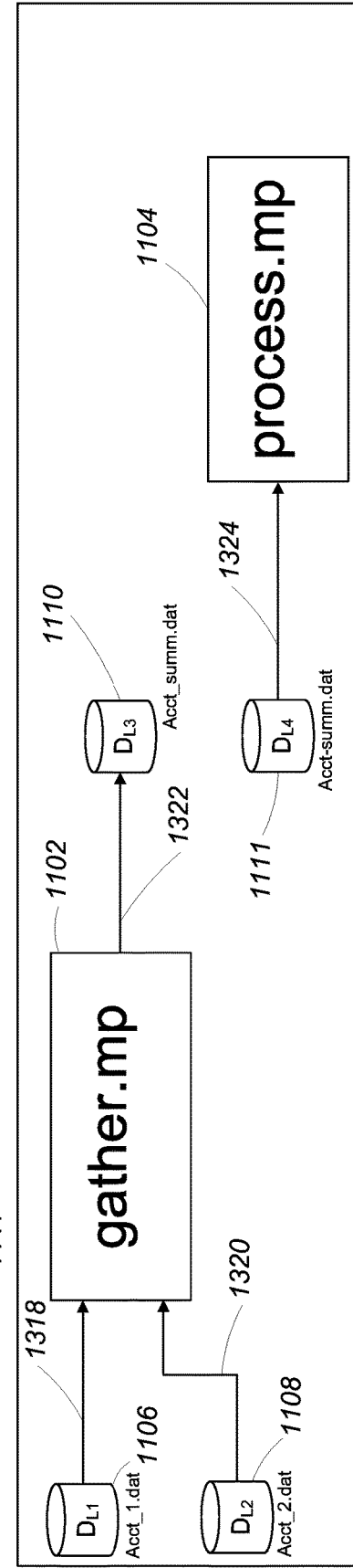
FIG. 11
FIG. 12
FIG. 13

MANAGING PARAMETER SETS

CROSS-REFERENCE TO RELATED APPLICATIONS

This application is a continuation of U.S. application Ser. No. 14/803,374, filed on Jul. 20, 2015 and issued as U.S. Pat. No. 10,318,283 on Jun. 11, 2019, which claims priority to U.S. Application Ser. No. 62/026,228, filed on Jul. 18, 2014, the contents of which are incorporated herein by reference.

BACKGROUND

This description relates to managing parameter sets.

In data processing systems it is often desirable for certain types of users to have access to reports of a lineage of data as it passes through the systems. Very generally, among a number of uses, such "data lineage" reports can be used to reduce risk, verify compliance obligations, streamline business processes, and safeguard data. It is important that data lineage reports are both correct and complete.

SUMMARY

In one aspect, in general, managing sets of parameter values and the lineage information that reflects relationships among instances of generic computer programs that were instantiating using those sets of parameter values, enables generation of more accurate and complete data lineage reports.

In another aspect, in general, a method for managing sets of parameter values includes: receiving a plurality of sets of parameter values for a generic computer program, and processing log entries associated with executions of instances of the generic computer program, each instance of the generic computer program being associated with one or more parameter values. The processing includes: analyzing the generic computer program to classify each of one or more parameters associated with the generic computer program as a member of either a first class of parameters or a second class of parameters; processing a log entry associated with an execution of a first instance of the generic computer program to form a particular set of parameter values, wherein the processing includes: including, in the particular set, any values of parameters classified as members of the first class occurring in the log entry, and excluding, from the particular set, any values of parameters classified as members of the second class occurring in the log entry; and determining whether to add the particular set of parameter values to the plurality of sets of parameter values based on a comparison of a first identifier for the particular set of parameter values to identifiers for at least some of the sets of parameter values of the plurality of sets of parameter values.

Aspects can include one or more of the following features.

Processing the log entries includes classifying parameters based on whether or not the parameters affect data lineage associated with the generic computer program.

The comparison of the first identifier for the particular set of parameter values to the identifiers for at least some of the sets of parameter values of the plurality of sets of parameter values includes: determining the first identifier based on the particular set of parameter values and an identifier of the generic computer program; determining a plurality of second identifiers, one for each set of parameter values of the at least some of the sets of parameter values; and comparing the first identifier to each second identifier of the plurality of second identifiers to determine whether the first identifier and any of the second identifiers match.

Determining whether to add the particular set of parameter values to the plurality of sets of parameter values includes determining to add the particular set of parameter values to the plurality of sets of parameter values if none of the second identifiers match the first identifier.

Determining the first identifier includes computing an identification string from the contents of the particular set of parameter values, and determining the second identifiers includes computing identification strings from the contents of the at least some of the sets of parameter values of the plurality of sets of parameter values.

Determining the first identifier includes forming a concatenation of one or more of the identifier of the generic computer program, name-value pairs of the particular set of parameter values, a function prototype of the generic computer program, and a project scope for the first instance of the generic computer program.

Determining the first identifier includes applying a data mapping function to one or more of the identifier of the generic computer program, name-value pairs of the particular set of parameter values, a function prototype of the generic computer program, and a project scope for the first instance of the generic computer program.

The data mapping function includes a hash function.

The first class of parameters includes parameters that affect the logical operation of the generic computer program and the second class of parameters includes parameters that do not affect the logical operation of the generic computer program.

The generic computer program is specified as a dataflow graph that includes nodes representing data processing operations and links between the nodes representing flows of data elements between the data processing operations.

For each of the parameters, the analysis includes either automatically classifying the parameter or accepting a user-defined classification for the parameter.

Automatically classifying the parameter includes initially classifying the parameter as belonging to the first class of parameters, determining a number of unique values of the parameter in a plurality of executions of instances of the generic computer program, and re-classifying the parameter as belonging to the second class of parameters if the number of unique values of the parameter exceeds a predetermined threshold.

Automatically classifying the parameter includes initially classifying the parameter as belonging to the first class of parameters, determining whether or not changes in values of the parameter in a plurality of executions of instances of the generic computer program affect data lineage associated with the generic computer program, and re-classifying the parameter as belonging to the second class of parameters if changes in values of the parameter do not affect the data lineage.

The method further includes forming an association between the log entry associated with the execution of the first instance of the generic computer program and the particular set of parameter values.

The log entry associated with the execution of the first instance of the generic computer program includes a log entry of an execution command used to instantiate the generic computer program including one or more parameter values supplied as arguments to the execution command.

The log entry associated with the execution of the first instance of the generic computer program further includes one or more of an indication of the project that the first instance executed in, an indication of internal parameters for the first instance, and an indication of environmental settings, global variables, and configuration variables used by the first instance.

The method further includes processing an overall plurality of sets of parameter values for a plurality of generic computer programs and an overall plurality of log entries associated with executions of instances of at least some of the plurality of generic computer programs to form a data lineage report, wherein the overall plurality of sets of parameter values includes the augmented plurality of sets of parameter values for the generic computer program, and the overall plurality of log entries associated with executions of instances of the at least some of the plurality of generic computer programs includes the log entry of the execution of the first instance of the generic computer program, including its association with the particular set of parameter values.

Forming the data lineage report includes, for each set of parameter values of the overall plurality of sets of parameter values for the plurality of generic computer programs, processing the overall plurality of log entries associated with executions of instances of the at least some of the plurality of generic computer programs to identify all log entries associated with executions of instances of the generic computer program corresponding to the set of parameter values, and identifying a most recent time of instantiation of the generic computer program from the identified log entries associated with executions of instances of the generic computer program; and determining whether to include the set of parameters in the data lineage report based on the most recent time of instantiation of the generic computer program.

Determining whether to include the set of parameters in the data lineage report based on the most recent time of instantiation of the generic computer program includes comparing the most recent time of instantiation to a predetermined time interval and including the set of parameters in the data lineage report if the most recent time of instantiation of the generic computer program is within the predetermined time interval.

Forming the data lineage report includes, for each set of parameter values of the overall plurality of sets of parameter values for the plurality of generic computer programs, processing the overall plurality of log entries associated with executions of instances of the at least some of the plurality of generic computer programs to determine a number of log entries associated with executions of instances of the generic computer program corresponding to the set of parameter values, and determining whether to include the set of parameters in the data lineage report based on the number of log entries associated with executions of instances of the generic computer program.

In another aspect, in general, software is stored in a non-transitory form on a computer-readable medium, for managing sets of parameter values, the software including instructions for causing a computing system to: receive a plurality of sets of parameter values for a generic computer program, and process log entries associated with executions of instances of the generic computer program, each instance of the generic computer program being associated with one or more parameter values, and augmenting the plurality of sets of parameter values based on the processing. The processing includes: analyzing the generic computer program to classify each of one or more parameters associated with the generic computer program as a member of either a first class of parameters or a second class of parameters; processing a log entry associated with an execution of a first instance of the generic computer program to form a particular set of parameter values, wherein the processing includes: including, in the particular set, any values of parameters classified as members of the first class occurring in the log entry, and excluding, from the particular set, any values of parameters classified as members of the second class occurring in the log entry; and determining whether to add the particular set of parameter values to the plurality of sets of parameter values based on a comparison of a first identifier for the particular set of parameter values to identifiers for at least some of the sets of parameter values of the plurality of sets of parameter values.

In another aspect, in general, a computing system for managing sets of parameter values includes: an input device or port for receiving a plurality of sets of parameter values for a generic computer program, and at least one processor for processing log entries associated with executions of instances of the generic computer program, each instance of the generic computer program being associated with one or more parameter values. The processing includes: analyzing the generic computer program to classify each of one or more parameters associated with the generic computer program as a member of either a first class of parameters or a second class of parameters; processing a log entry associated with an execution of a first instance of the generic computer program to form a particular set of parameter values, wherein the processing includes: including, in the particular set, any values of parameters classified as members of the first class occurring in the log entry, and excluding, from the particular set, any values of parameters classified as members of the second class occurring in the log entry; and determining whether to add the particular set of parameter values to the plurality of sets of parameter values based on a comparison of a first identifier for the particular set of parameter values to identifiers for at least some of the sets of parameter values of the plurality of sets of parameter values.

In another aspect, in general, a computing system for managing sets of parameter values includes: means for receiving a plurality of sets of parameter values for a generic computer program, and means for processing log entries associated with executions of instances of the generic computer program, each instance of the generic computer program being associated with one or more parameter values. The processing includes: analyzing the generic computer program to classify each of one or more parameters associated with the generic computer program as a member of either a first class of parameters or a second class of parameters; processing a log entry associated with an execution of a first instance of the generic computer program to form a particular set of parameter values, wherein the processing includes: including, in the particular set, any values of parameters classified as members of the first class occurring in the log entry, and excluding, from the particular set, any values of parameters classified as members of the second class occurring in the log entry; and determining whether to add the particular set of parameter values to the plurality of sets of parameter values based on a comparison of a first identifier for the particular set of parameter values to identifiers for at least some of the sets of parameter values of the plurality of sets of parameter values.

In another aspect, in general, a method for managing sets of parameter values includes: receiving a generic computer program; receiving a first set of parameter values; generating an executable instance of the generic computer program by instantiating the generic computer program according to the first set of parameter values; receiving data from one or more data sets; executing the executable instance of the generic computer program to process at least some of the received data; generating a log entry for the executable instance of the generic computer program, the log entry including at least some of the parameter values of the first set of parameter values; storing the log entry; receiving the log entry; processing the log entry to form a particular set of parameter values, wherein the processing includes extracting the at least some of the parameter values of the first set of parameter values from the log entry and forming the particular set of parameter values from the extracted parameter values; and determining whether to add the particular set of parameter values to a plurality of preexisting sets of parameter values based on a comparison of a first identifier for the particular set of parameter values to identifiers for at least some of the preexisting sets of parameter values of the plurality of preexisting sets of parameter values.

Aspects can include one or more of the following features.

The comparison of the identifier for the particular set of parameter values to the identifiers for at least some of the preexisting sets of parameter values of the plurality of preexisting sets of parameter values includes: determining the first identifier based on the particular set of parameter values and an identifier of the generic computer program; determining a plurality of second identifiers, one for each preexisting set of parameter values of the at least some of the preexisting sets of parameter values; and comparing the first identifier to each second identifier of the plurality of second identifiers to determine whether the first identifier and any of the second identifiers match.

Determining whether to add the particular set of parameter values to the plurality of preexisting sets of parameter values includes determining to add the particular set of parameter values to the plurality of preexisting sets of parameter values if none of the second identifiers match the first identifier.

Determining the first identifier includes computing an identification string from the contents of the particular set of parameter values, and determining the second identifiers includes computing identification strings from the contents of the at least some of the preexisting sets of parameter values of the plurality of preexisting sets of parameter values.

Determining the first identifier includes forming a concatenation of one or more of the identifier of the generic computer program, name-value pairs of the particular set of parameter values, a function prototype of the generic computer program, and a project scope for the executable instance of the generic computer program.

Determining the first identifier includes applying a data mapping function to one or more of the identifier of the generic computer program, name-value pairs of the particular set of parameter values, a function prototype of the generic computer program, and a project scope for the executable instance of the generic computer program.

The data mapping function includes a hash function.

The method further includes analyzing the generic computer program to classify each of one or more parameters associated with the generic computer program as a member of either a first class of parameters or a second class of parameters.

Processing the log entry to form a particular set of parameter values further includes: including, in the particular set, any extracted parameter values classified as members of the first class occurring in the log entry, and excluding, from the particular set, any extracted parameter values classified as members of the second class occurring in the log entry.

The first class of parameters includes parameters that affect the logical operation of the generic computer program and the second class of parameters includes parameters that do not affect the logical operation of the generic computer program.

In another aspect, in general, software is stored in a non-transitory form on a computer-readable medium, for managing sets of parameter values, the software including instructions for causing a computing system to: receive a generic computer program; receive a first set of parameter values; generate an executable instance of the generic computer program by instantiating the generic computer program according to the first set of parameter values; receive data from one or more data sets; execute the executable instance of the generic computer program to process at least some of the received data; generate a log entry for the executable instance of the generic computer program, the log entry including at least some of the parameter values of the first set of parameter values; store the log entry; receive the log entry; process the log entry to form a particular set of parameter values, wherein the processing includes extracting the at least some of the parameter values of the first set of parameter values from the log entry and forming the particular set of parameter values from the extracted parameter values; and determine whether to add the particular set of parameter values to a plurality of preexisting sets of parameter values based on a comparison of a first identifier for the particular set of parameter values to identifiers for at least some of the preexisting sets of parameter values of the plurality of preexisting sets of parameter values.

In another aspect, in general, a system for managing sets of parameter values includes: a first computing system including a first input device or port for receiving a generic computer program, a first set of parameter values, and data from one or more data sets; a first set of one or more processors configured to: generate an executable instance of the generic computer program by instantiating the generic computer program according to the first set of parameter values; execute the executable instance of the generic computer program to process at least some of the received data; generate a log entry for the executable instance of the generic computer program, the log entry including at least some of the parameter values of the first set of parameter values; a first output device or port for storing the log entry in a storage device; a second computing system including a second input device or port for receiving the log entry; a second set of one or more processors configured to: process the log entry to form a particular set of parameter values, wherein the processing includes extracting the at least some of the parameter values of the first set of parameter values from the log entry and forming the particular set of parameter values from the extracted parameter values; and determine whether to add the particular set of parameter values to a plurality of preexisting sets of parameter values based on a comparison of a first identifier for the particular set of parameter values to identifiers for at least some of the preexisting sets of parameter values of the plurality of preexisting sets of parameter values.

Aspects can include one or more of the following advantages.

By discovering parameter sets using the approaches described herein and using the discovered parameter sets to augment an existing set of parameter sets, data lineage reports generated using the augmented set of existing parameter sets more accurately represent the true data lineage of a data processing system. In particular, portions of the data lineage for the data processing system that would have been previously overlooked are included in the data lineage report.

In some examples, the results of the parameter set discovery approaches can also be used to augment the log entries of executions of instances of the computer program (i.e., augmenting the log entries with information about discovered parameter sets). The augmented log entry can advantageously be used to verify that logical connections between computer programs and/or datasets correspond to physical connections. The results of this verification ensure that the data lineage presented to a user shows the correct lineage relationships among computer programs and their inputs and outputs.

Other features and advantages of the invention will become apparent from the following description, and from the claims.

DESCRIPTION OF DRAWINGS

FIG. 11 is an example dataflow graph including a first sub-graph and a second sub-graph and having duplicate logical datasets.

FIG. 12 shows the example dataflow graph of FIG. 11 with its logical datasets resolved to physical datasets.

FIG. 13 shows a data lineage report, including a data lineage break, for the dataflow graph of FIG. 11.

DESCRIPTION

Figure 1:
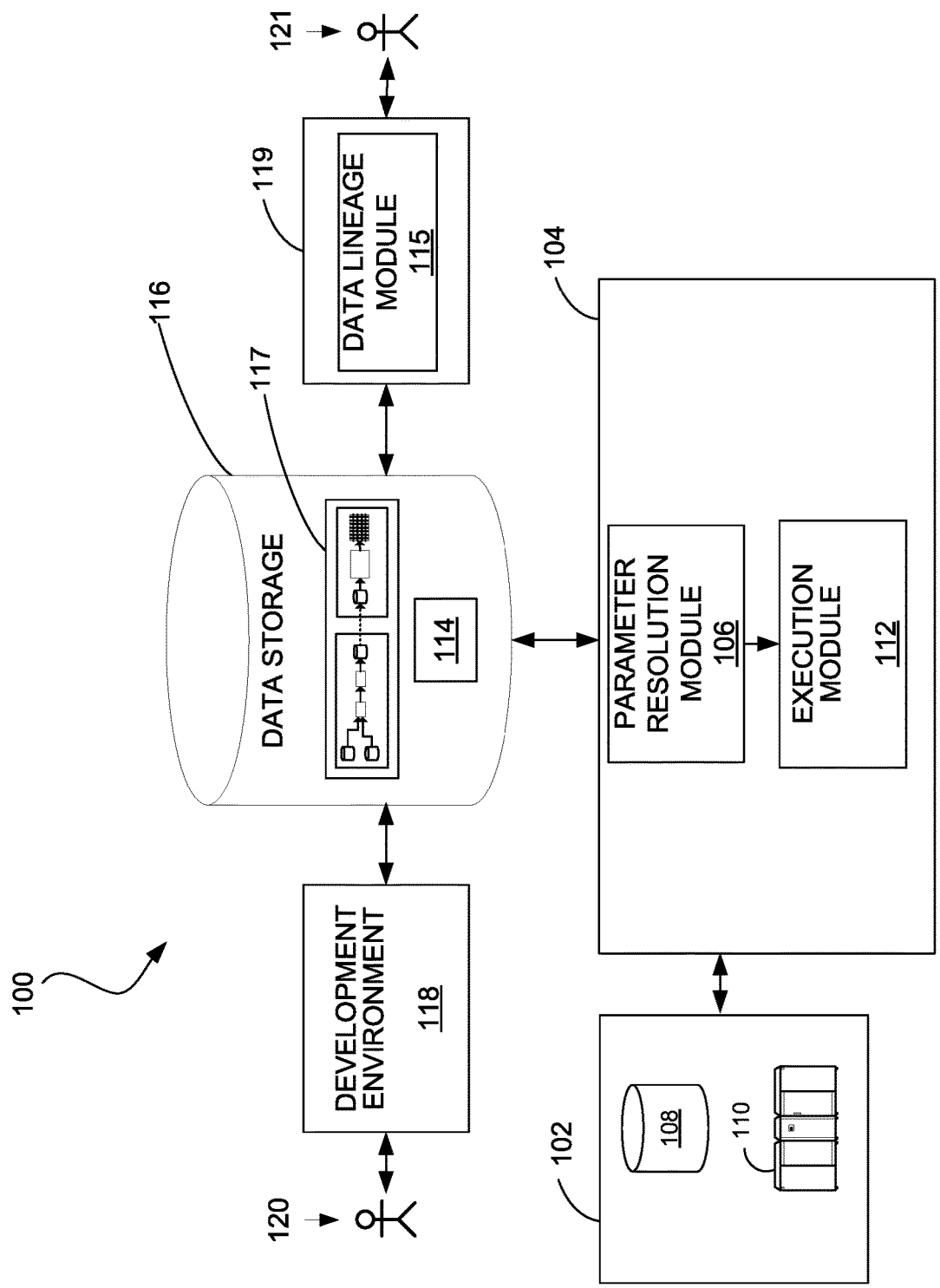
FIG. 1 is a block diagram of a system for discovery of parameter sets.

FIG. 1 shows an example of a data processing system 100 in which the parameter set discovery techniques described herein can be used. The system includes a development environment 118 which is, in some implementations, a system for developing applications as dataflow graphs 117 that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS," incorporated herein by reference. The dataflow graphs 117 made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes). The dataflow graphs 117 created by the developer 120 using the development environment 118 can be stored in a data storage system 116 accessible to the development environment 118 for subsequent use by other modules of the system 100.

An execution environment 104 includes a parameter resolution module 106 and an execution module 112. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The parameter resolution module 106 receives a specification of the dataflow graphs 117 from the data storage system 116 and resolves parameters for the dataflow graphs 117 (as is described in greater detail below) to prepare the dataflow graph(s) 117 for execution by the execution module 112. The execution module 112 receives the prepared dataflow graphs 117 from the parameter resolution module 106 and uses them to process data from a data source 102 and generate output data 114. The output data 114 may be stored back in the data source 102 or in the data storage system 116 accessible to the execution environment 104, or otherwise used. In general, the data source 102 may include one or more sources of data such as storage devices or connections to online data streams, each of which may store or provide data in any of a variety of formats (e.g., database tables, spreadsheet files, flat text files, or a native format used by a mainframe).

Storage devices providing the data source 102 may be local to the execution environment 104, for example, being stored on a storage medium connected to a computer hosting the execution environment 104 (e.g., hard drive 108), or may be remote to the execution environment 104, for example, being hosted on a remote system (e.g., mainframe 110) in communication with a computer hosting the execution environment 104, over a remote connection (e.g., provided by a cloud computing infrastructure).

The system 100 also includes a metadata environment module 119, which is accessible to enterprise users 121 (e.g., data architects or business users). The metadata environment module 119 includes a data lineage module 115, which processes the dataflow graphs 117 (or metadata that characterizes them and the input and output datasets they reference) to generate a data lineage for the dataflow graphs 117. The enterprise user 121 can view the data lineage for reasons such as verification of the dataflow graphs 117 and compliance checking. Data lineage information about a particular data item (e.g., a dataset, or field within a dataset) is based on dependency relationships that arise from processing that is performed by a data processing system, and the term "data lineage" as used herein, generally refers to the set that includes other related data items and the processing entities that consume or generate those data items. A data lineage report (also called a data lineage diagram) may include a graphical representation of the data lineage in the form of a graph with nodes representing the data items and processing entities, and links representing the dependency relationships among them. Some systems capable of generating and displaying data lineage reports are able to automatically present an end-to-end data lineage from ultimate sources of data at an upstream end to the final data produced at a downstream end. Nodes on a path upstream from a particular data item are sometimes called "dependencies" for that data item, and nodes on a path downstream from a particular data item are sometimes called "impacts" for that data item. While "data lineage" is sometimes used to refer only to the upstream dependencies, as used herein, "data lineage" may refer to either or both upstream dependencies and/or downstream impacts as appropriate to the specific context.

1 Dataflow Graph Overview

Figure 2:
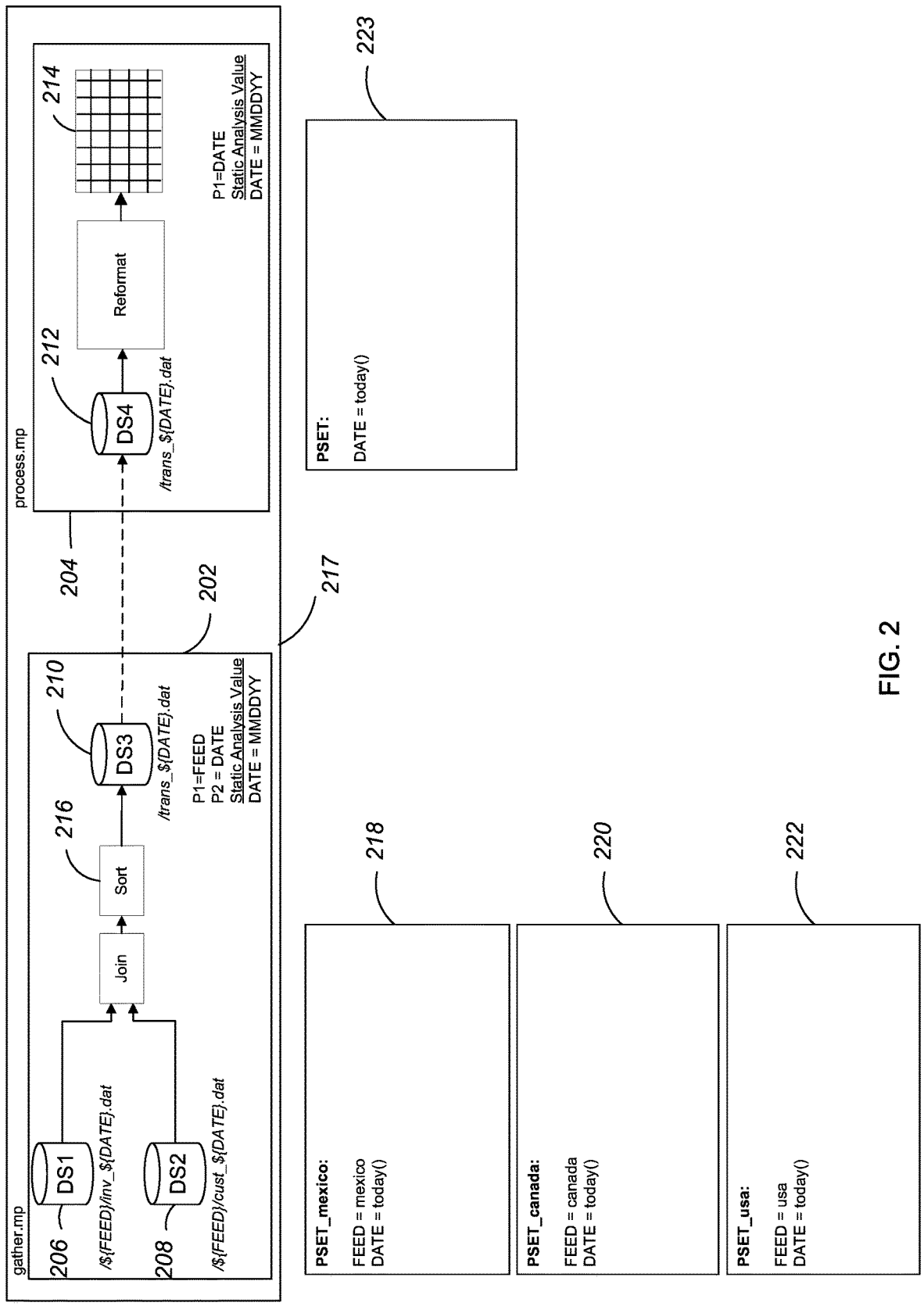
FIG. 2 is a dataflow graph including sub-graphs and their associated parameter sets.

Referring to FIG. 2, an example of a dataflow graph 217 generated using the development environment 118 of FIG. 1 includes a first sub-graph 202 named gather.mp and a second sub-graph 204 named process.mp.

The first sub-graph 202 receives a first logical dataset DS1 206 and a second logical dataset DS2 208 as input, processes the data from the first and second logical datasets 206, 208 and writes a result of the processing into a third logical dataset DS3 210. The second sub-graph 204 receives a fourth logical dataset DS4 212 (which happens to point to the same physical file as the third logical dataset 210) as input, processes the data from the fourth logical dataset 212, and writes the result of the processing to a table 214.

Each of the four logical datasets 206, 208, 210, 212 is associated with a parameterized path which, at run time, resolves to a path to a physical file. In particular, the first logical dataset 206 is identified using the parameterized path/${FEED}/inv_{DATE}.dat, the second logical dataset 208 is identified using the parameterized path/${FEED}/cust_${DATE}.dat, the third logical dataset 210 is identified using the parameterized path/trans_${DATE}.dat, and the fourth logical dataset 212 is identified using the parameterized path/trans_${DATE}.dat.

The first sub-graph 202 receives two parameters, P1=FEED and P2=DATE as arguments and, as is described in greater detail below, uses the parameters to resolve the paths to the respective physical locations of the first logical dataset 206, the second logical dataset 208, and the third logical dataset 210 by replacing the FEED and DATE placeholders in the parameterized paths with the values of the received FEED and DATE parameters. Additionally, the first sub-graph 202 includes a "static analysis" value for the DATE parameter. As is described in greater detail below, the static analysis value for the DATE parameter is a placeholder value which is used as the parameter value during static analysis of the dataflow graph 217 (i.e., when the data lineage of the dataflow graph 217 is determined).

Similarly, the second sub-graph 104 receives a single parameter P1=DATE and uses it to resolve the path to the physical location of the fourth logical dataset 212 by replacing the DATE placeholder in the parameterized path for the fourth logical dataset 212 with the value of the received DATE parameter. Additionally, the second sub-graph 204 includes a "static analysis" value for the DATE parameter. As is described in greater detail below, the static analysis value for the DATE parameter is a placeholder value which is used as the parameter value during static analysis of the dataflow graph 217 (i.e., when the data lineage of the dataflow graph 217 is determined).

Since the operation of the dataflow graph 217 and its sub-graphs depends on the parameters that it receives, the dataflow graph and its sub-graphs are sometimes referred to "generic" dataflow graphs or "generic" computer programs.

1.1 Parameters

In general, the parameters described above can be designated as either "design time" parameters or "run time" parameters. In addition to being used for path resolution as described above, design time parameters affect the logical operation of their associated dataflow graph. In contrast, run time parameters are supplied to the graph on a job-by-job basis and do not affect the logical operation of the graph. In some examples, the logical operation of a dataflow graph refers to both the functionality of the graph and the logical datasets utilized by the graph.

In FIG. 2, the FEED parameter is a design time parameter which affects the logical operation of the gather.mp sub-graph. For example, for one value of the FEED parameter, a sort component 216 in the first sub-graph 202 may sort the data that it receives in ascending order while another, different value of the FEED parameter may cause the sort component 216 to sort the data in descending order. In some examples, a dataflow graph which includes design time parameters is referred to as a "generic graph" since its logical operation changes based on the supplied value of the design time parameter.

The DATE parameter is a run time parameter which has no effect on the logical operation of the sub-graph 202 and is supplied on a job-by-job basis.

1.2 Parameter Sets

In some examples, commonly used sets of parameters for dataflow graphs are stored as "parameter sets" (sometimes referred to as "psets") which can be saved to disk and easily re-used. For example, in FIG. 2, the first sub-graph 202 has three psets associated with it, PSET_mexico 218, PSET_canada 220, and PSET_usa 222. PSET_mexico 218 includes a commonly used FEED parameter value "mexico" and a commonly used DATE parameter value "today( )" which is a function that returns today's date. PSET_canada 220 includes a commonly used FEED parameter value "canada" and the commonly used DATE parameter value "today( )" PSET_usa 222 includes a commonly used FEED parameter value "usa" and the commonly used DATE parameter value "today( )."

Similarly, the second sub-graph 204 has a single pset associated with it, PSET 223. PSET 223 includes the commonly used DATE parameter value "today( )" which is a function that returns today's date.

2 Parameter Resolution Module

Figure 3:
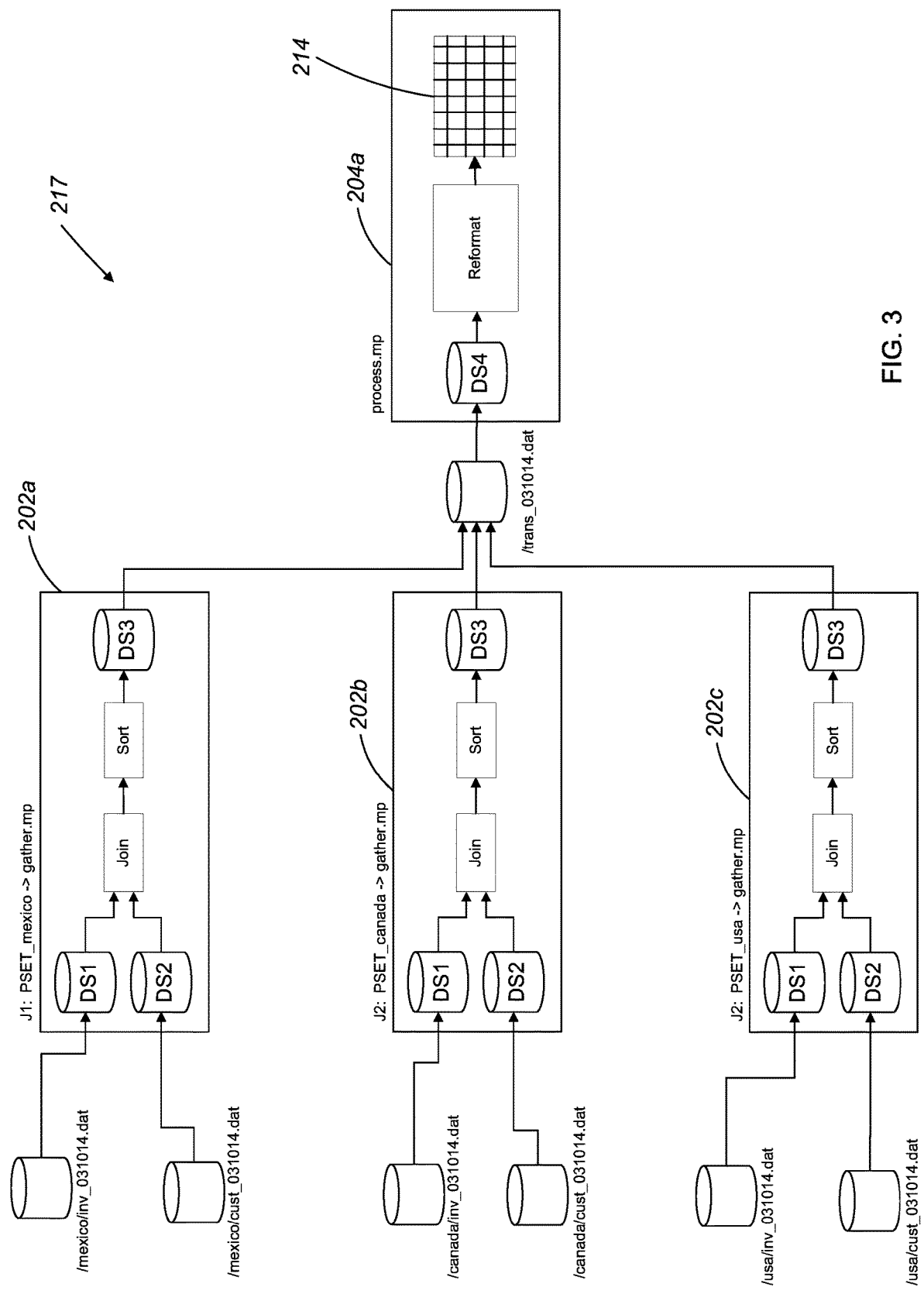
FIG. 3 is a run time configuration of the dataflow graph of FIG. 2.

In some examples, prior to the dataflow graph 117 being executed by the execution module 112, the parameter resolution module 106 of FIG. 1 identifies one or more psets associated with the dataflow graph 117 (and its associated sub-graphs 202, 204) and determines a number of unique design time parameters in the one or more psets. For each unique design time parameter for a given dataflow graph, the parameter resolution module 106 instantiates a separate executable instance of the dataflow graph. For example, referring to FIG. 3, for the dataflow graph 217 of FIG. 2, three instances of the first sub-graph 202, gather.mp are instantiated (PSET_mexico->gather.mp 202a, PSET_canada->gather.mp 202b, PSET_usa->gather.mp 202c), each instance configured according to a different one of the three unique feed parameters in the psets of FIG. 2: mexico, canada, and usa. Since the second sub-graph 204 is associated with only a single pset 223 that does not include any design time parameters, only a single instance (process.mp 204a) of the second sub-graph 204 is instantiated at execution time.

Once the appropriate instances of the sub-graphs 202, 204 are instantiated by the parameter resolution module 106, the parameter resolution module 106 replaces the parameter value placeholders in the parameterized paths for the datasets with actual parameter values from the psets, resolving the paths to the physical locations of the datasets. For example, for the PSET_mexico->gather.mp instance 202a of the first sub-graph 202, the path for the first dataset 206 is resolved to/mexico/inv_031014 since the FEED parameter value is 'mexico' and the DATE parameter value is '031014.'

Once the parameter resolution module 106 has instantiated the dataflow graph 217 including its sub-graphs 202, 204 and has resolved the physical paths to the dataflow graph's 217 datasets, the dataflow graph 217 is prepared for execution by the execution module 112. During execution, the three instances 202a, 202b, 202c of the first sub-graph 202 read data from their respective input datasets, process the data, and store the processed data in the/trans_031014.dat physical file. Since the input dataset (e.g., DS4 212) for the instance 204a of the second sub-graph 202 resolves to the same physical file as the output dataset of the first sub-graph, the/trans_031014.dat physical file is read by the instance of process.mp and then processed and stored in the table 214.

3 Data Lineage Module

Figure 4:
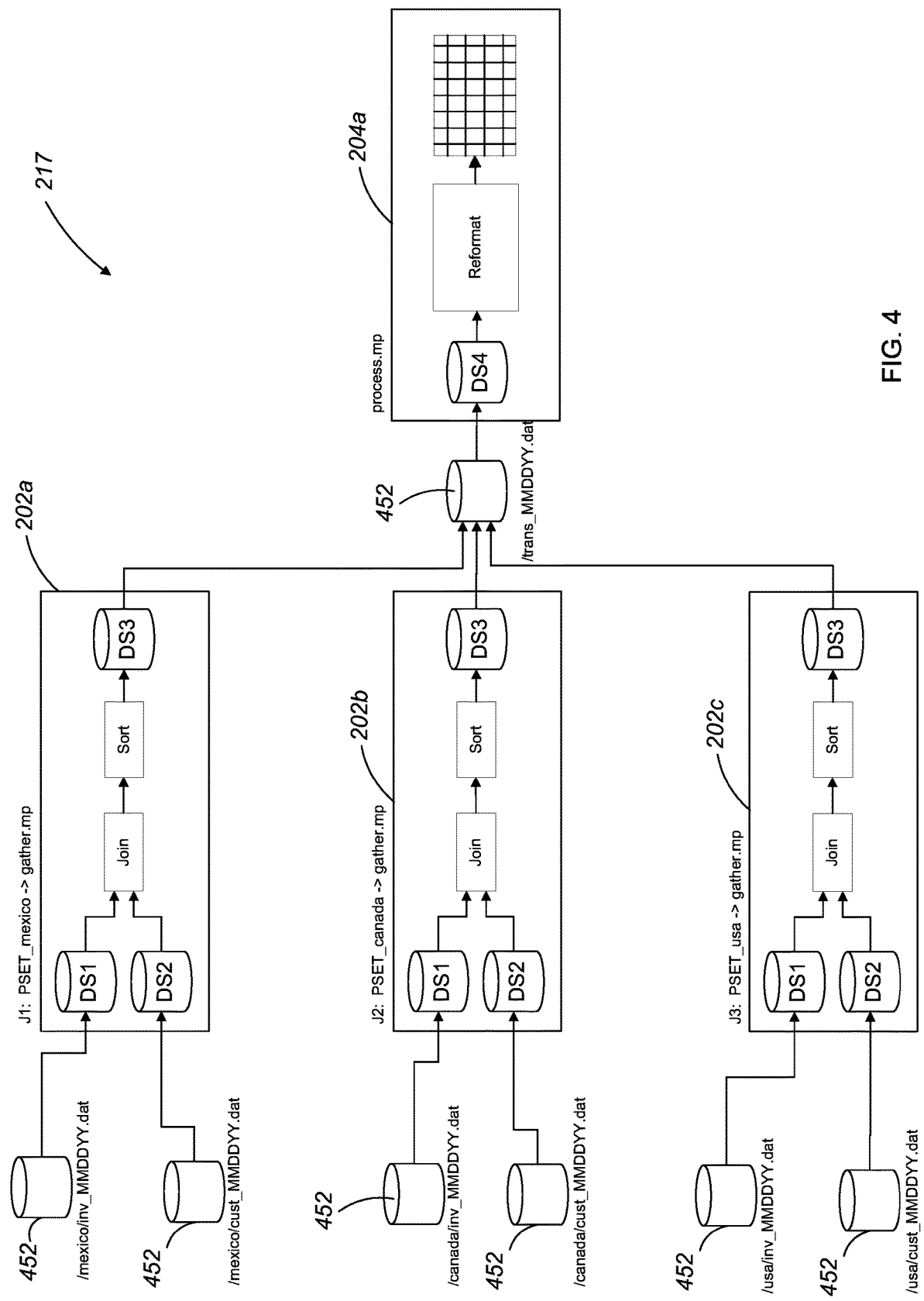
FIG. 4 is a static analysis configuration of the dataflow graph of FIG. 2.

Referring to FIG. 4, in some examples, rather than executing the dataflow graph 217, the data architect or business user 121 of FIG. 1 may have a need to inspect the lineage of data as it passes through the dataflow graph 217. To do so, the data lineage module 115 of FIG. 1 is configured to analyze the dataflow graph 217 to generate a data lineage report for presentation to the data architect or business user 121.

In some examples, as a first step in determining the data lineage for the dataflow graph 217, data lineage module 115 identifies the individual sub-graphs 202, 204 of the dataflow graph 217. For each of the identified sub-graphs 202, 204, the data lineage module 115 identifies one or more psets 218, 220, 222, 223 associated with the sub-graph 202, 204 and then determines a number of unique design time parameters in the one or more psets 218, 220, 222, 223 for the sub-graph 202, 204. For each unique design time parameter, the parameter resolution module instantiates a separate instance of the sub-graph 202, 204.

In some examples, the data lineage module 115 operates under an assumption that the actual physical files and the data which they store are irrelevant to data lineage analysis. For this reason, any run time parameter values which are used to resolve the physical locations of the datasets are unnecessary and can be replaced with placeholder values. As is noted above, for each run time parameter associated with a sub-graph, a corresponding placeholder, static analysis parameter value is included in the sub-graph. For example, in FIG. 2, since both dataflow graphs 202, 204 include the DATE run time parameter, they also both include a placeholder, static analysis parameter value of 'MMDDYY.'

When the data lineage module 115 analyzes the dataflow graph 217 to determine the data lineage, all instances of the DATE parameter in the dataflow graph are replaced with the 'MMDDYY,' placeholder value, creating temporary dataset objects 452 as is shown in FIG. 4. The interconnections between the various sub-graph instances and the temporary dataset objects are then identified, and presented to the data architect or business user as the data lineage. For example, an analysis of the instances 202a, 202b, 202c of the first sub-graph 202 indicates that all of the instances of the first sub-graph 202 write data to a dataset that is represented by the/trans_MMDDYY.dat dataset object. The analysis then indicates that the instance 204a of the second dataflow graph 204 reads from the dataset that is represented by the/trans_WDDYY.dat dataset object. Based on this information, the data lineage for the dataflow graph 217 indicates that the outputs of the instances 202a, 202b, 202c of the first sub-graph 202 are fed into the input of the instance 204a of the second sub-graph 204.

4 Logical pset Discovery and Creation Method

In some examples, a given dataflow graph is executed using an execution command which receives parameter values as arguments supplied to the execution command rather than from a previously stored pset. Since the method described above determines data lineage using only stored psets, psets associated with the parameter values originating from arguments supplied to the execution command for an execution of the dataflow graph are not represented in the data lineage. This can result in an incomplete or incorrect data lineage being provided to an enterprise architect or an auditor.

Figure 5:
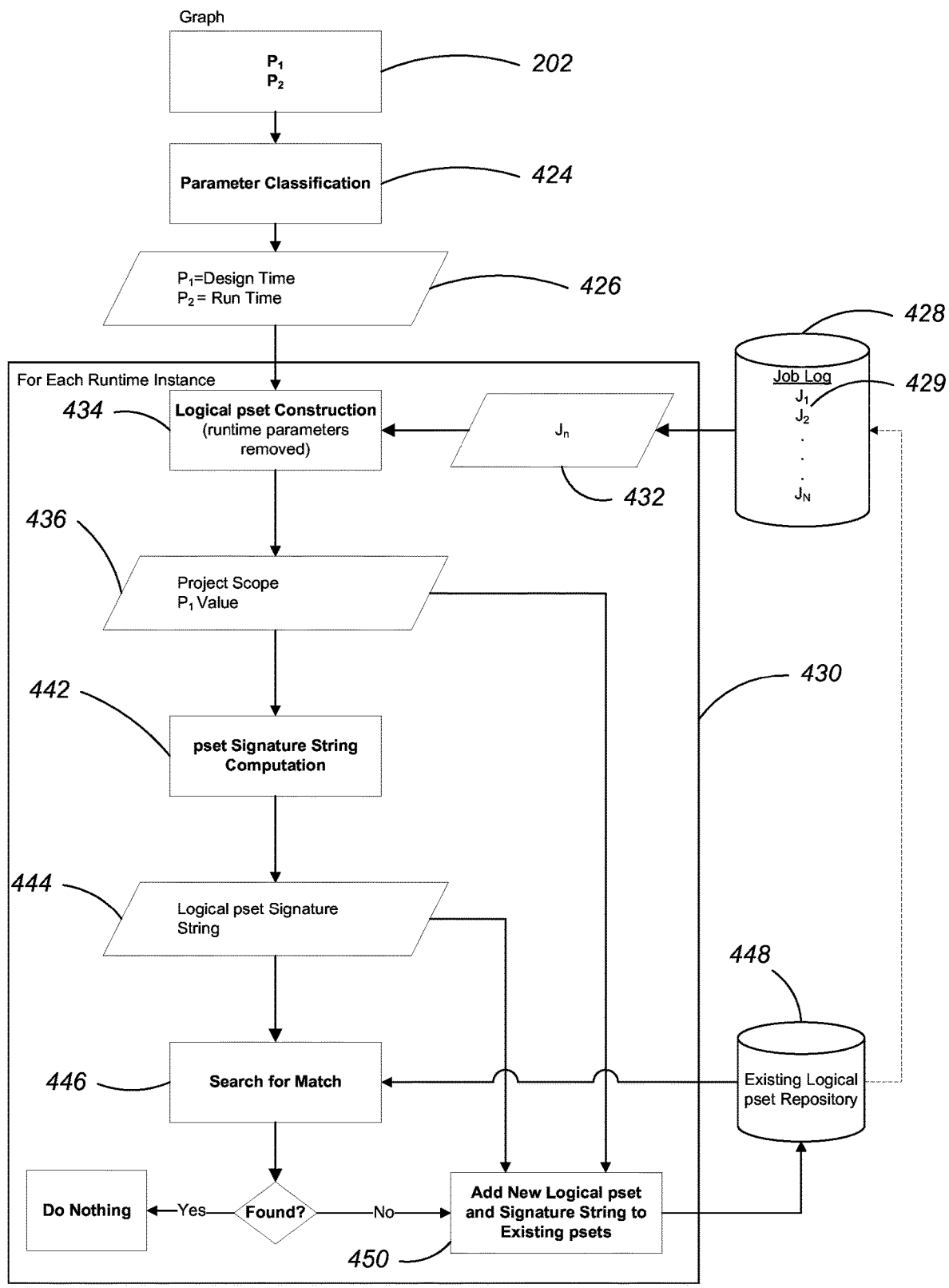
FIG. 5 is a flow chart of a method for discovery of parameter sets.

FIG. 5 is a flowchart illustrating a method for augmenting a repository of existing logical parameter sets (psets) for a dataflow graph with logical psets created based on sets of parameters identified in a log associated with executions of instances of the dataflow graph. In some examples, the method of described in FIG. 5 is implemented by the data lineage module 115 of FIG. 1.

4.1 Graph Parameters

Initially one example of a dataflow graph (e.g., the first sub-graph 202 of FIG. 1) includes two parameters (P1 and P2), each of which can be designated as either a "design time" parameter or a "run time" parameter. As is noted above, a design time parameter is a parameter which affects the logical operation of the graph (e.g., can alter a transformation performed by the graph) while a run time parameter is a parameter which changes on a job-by-job basis (e.g., a date) and does not affect the logical operation of the graph.

4.2 Parameter Classification

The graph 202 is provided to a parameter classification step 424 which analyzes the parameters of the graph 202 to generate parameter classification result 426. In the parameter classification result 426, each parameter is classified as either a design time parameter or a run time parameter. In the exemplary case illustrated in the flow chart, P1 is classified as a design time parameter and P2 is classified as a run time parameter.

In some examples, the parameters for a dataflow graph are pre-classified (e.g., by a user) as being either design time or run time parameters. In other examples (e.g., for legacy dataflow graphs), the parameters for the dataflow graph are not pre-classified as being either design time or run time parameters. In such cases, the parameter classification step 424 may assume that all parameters are design time parameters. In a later re-classification step, if it is determined that a given parameter has a large (e.g., above a given threshold) number of unique values in a collection of log entries (e.g., the job log data store described below), then the given parameter may be re-classified as a run time parameter. Alternatively, re-classification can be based on data lineage sensitivity analysis. In particular, if a parameter can take on a variety of different values without altering the data lineage internal to the dataflow graph (i.e., impacts or dependencies of datasets or components within the dataflow graph), then the parameter can be classified as a run time parameter. For example, if the associated record formats or other characteristics of a dataset in a graph (e.g., DS1, DS2, DS3 in FIG. 3) are not affected by the various values of a parameter, then that parameter is re-classified as a run time parameters. Variations of this data lineage sensitivity analysis can be used, such as a more comprehensive data lineage sensitivity analysis that includes resolving all internal impacts and dependencies, and a more limited data lineage sensitivity analysis that includes resolving just impacts and dependencies associated with dataset record formats.

In some examples (e.g., for legacy dataflow graphs), a parameter may include both design time and run time portions. For example, a filename parameter "/mexico/inv_031014.dat" may be a hybrid parameter in that it includes a design time portion (i.e., "mexico") and a run time portion (i.e., "031014"). In such examples, a user can supply a regular expression or some other type of string parsing rules which are used by the parameter classification step 424 to extract and classify the respective design time and run time parameters from the hybrid parameter.

4.3 Job Log Data Store

The method utilizes a job log data store 428 including a number of job log entries 429, each including information associated with executions of instances of the dataflow graph 202. Among other information, at least some of the job log entries include a record of an execution command which was used to instantiate the dataflow graph 202. The execution command for a given job log entry includes a graph name and parameter values which were supplied as arguments to the execution command. In general, at least some of the job log entries in the job log data store 428 instantiate the dataflow graph without accessing any parameter sets but instead receive parameter values as arguments supplied to the execution command.

4.4 Processing Loop

The job log data store 428 and the parameter classification result 426 are provided to a processing loop 430 which, for each job log entry 429 in the job log data store 428, generates a new logical pset for the graph execution command, determines whether the new logical pset already exists in a repository of existing logical psets 448, and adds the new logical pset to the repository 448 if it does not already exist.

4.4.1 Initial Command Line Logical pset Construction

Within the processing loop 430, the parameter classification result 426 and a job log entry, $J_n$ 432 from the job log data store 428 are provided to a logical pset construction step 434 which analyzes the job log entry 432 according to the parameter classification result 426 to generate a logical pset 436. In doing so, the logical pset construction step 434 analyzes the graph execution command included in the job log entry 432 to extract the parameter values that are included as arguments to the graph execution command. The logical pset construction step 434 also extracts a project scope included in the job log entry 432. In some examples, the project scope includes an indication of the project that the dataflow graph is executing in, an indication of internal parameters for the dataflow graph, and an indication of environmental settings, global variables and configuration variables used to by the dataflow graph.

The logical pset construction step 434 automatically includes the extracted project scope in the logical pset 436. The logical pset construction step 434 then matches each extracted parameter value with a corresponding parameter in the parameter classification result 426. If the logical pset construction step 434 determines that an extracted parameter value corresponds to a design time parameter in the parameter classification result 426, then the logical pset construction step 434 includes the value of the extracted design time parameter in the logical pset 436. If the logical pset construction step 434 determines than an extracted parameter value corresponds to a run time parameter in the parameter classification result 426, then the extracted parameter value is not included in the logical pset 436.

4.4.2 pset Signature String Computation

The logical pset 436 is provided to a pset signature string computation step 442 which computes a logical pset signature string 444 based on the project scope and the parameter values in the logical pset 436. In some examples, the pset signature string 444 is computed by serializing the project scope for the logical pset 436, name/value pairs of the parameters in the logical pset 436, and a prototype of the dataflow graph associated with the logical pset 436. In other examples, the pset signature string 444 is computed by applying a hash function or some other data mapping algorithm to the logical pset 436.

4.4.3 pset Signature String Search

The pset signature string 444 is provided to a pset signature search step 446 along with the pset signature strings of all existing logical psets in the repository of existing logical psets 448. For each of the existing logical psets, the pset signature string of the existing logical pset is compared to the pset signature string 444. If the pset signature string 444 matches at least one of the pset signature strings of the existing logical psets, then nothing needs to be done since a logical pset for the execution command instantiation of the graph 432 already exists in the repository of existing logical psets 448.

In some examples, the pset signature strings of all existing logical psets in the repository of existing logical psets 448 are stored along side the existing logical psets in the repository 448. In other examples, the signature strings for the existing logical psets are computed on the fly and on an as-needed basis.

4.4.4 Addition of New Logical pset

Otherwise, if none of the signature strings of the existing logical psets matches the pset signature string 444, the logical pset 436 and its signature string 444 are added as a new logical pset to the repository of existing logical psets 448 by a new logical pset addition step 450.

4.5 Example

Figure 6:
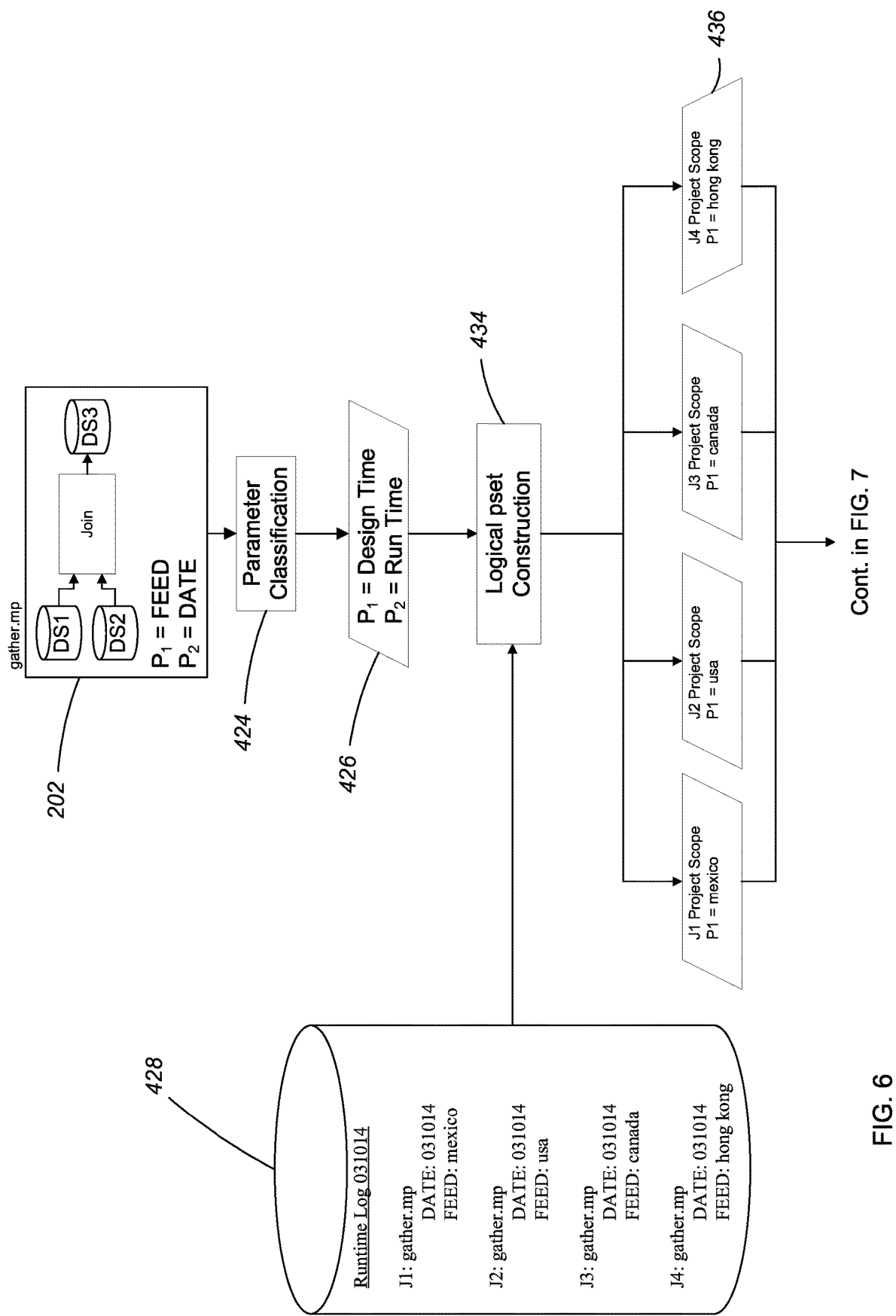
FIG. 6 is a first half of an exemplary operation of the method for discovery of parameter sets.
Figure 7:
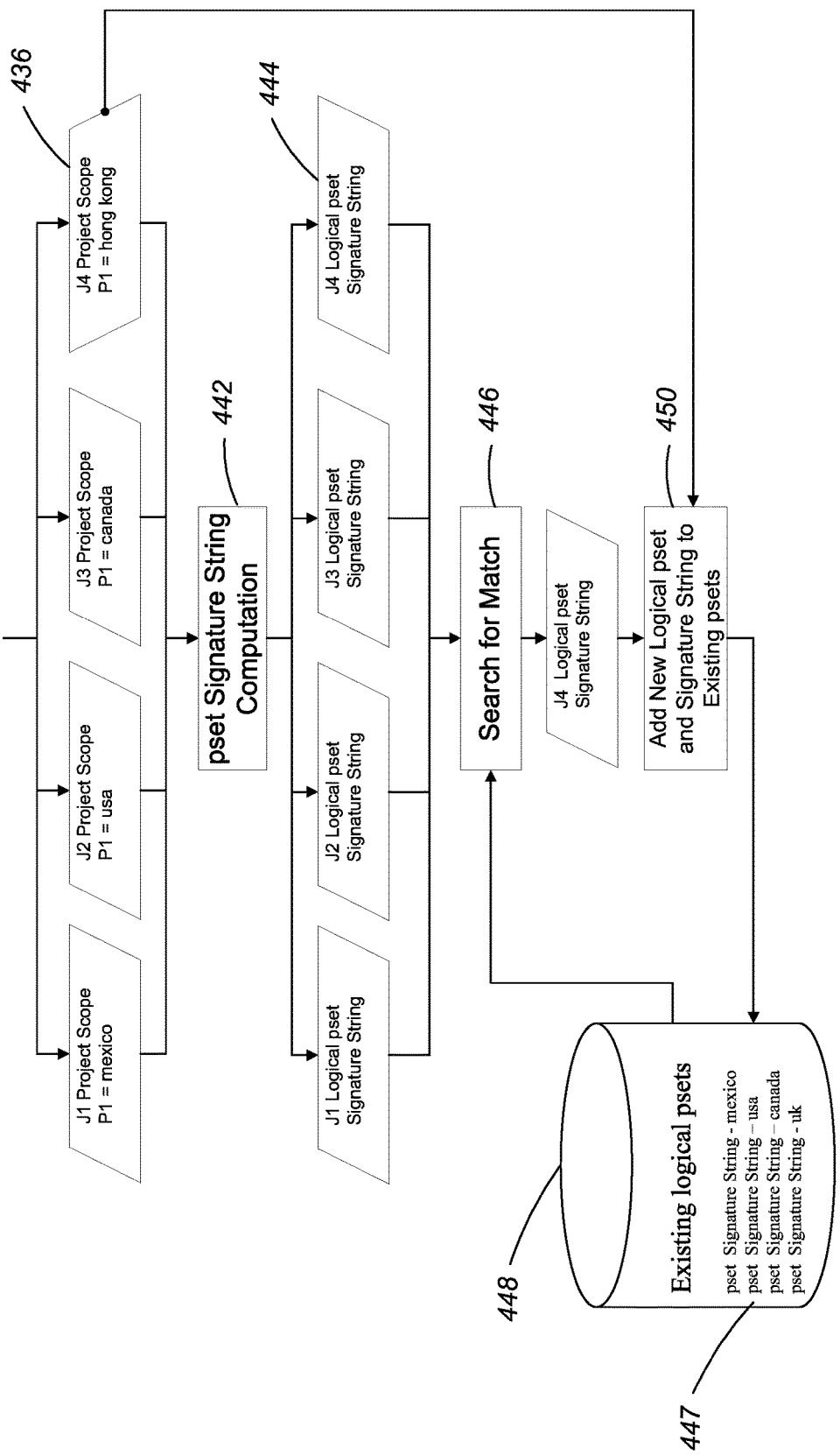
FIG. 7 is a second half of an exemplary operation of the method for discovery of parameter sets.

Referring to FIGS. 6 and 7, an exemplary operation of the logical pset discovery and creation method of FIG. 4 as applied to the first sub-graph 202 of FIG. 2 is presented. The first sub-graph 202 of FIG. 2 includes two parameters, P1=FEED and P2=DATE. The first sub-graph 202 is provided to the parameter classification step 424 where the parameters are classified as either "design time" or "run time" parameters, generating a parameter classification result 426. The parameter classification result 426 indicates that the P1 (FEED) parameter is a design time parameter and the P2 (DATE) parameter is a run time parameter.

The parameter classification result 426 and the job log data store 428 are provided to the logical pset construction step 434. In the example of FIG. 6, the job log data store 428 includes four job log entries that include information associated with executions of instances of the first sub-graph 202 (i.e., gather.mp). Each job log entry includes an execution command which received values for the DATE and FEED parameters as arguments.

The logical pset construction step 434 creates a different logical pset 436 for each of the job log entries in the job log data store 428. Since the P1 (FEED) parameter is a design time parameter, its value (e.g., mexico, usa, canada, or hong kong), which was supplied as an argument to the execution command, is included for each of the of the logical psets 436. Since the P2 (DATE) parameter is a run time parameter, its value, which was supplied as an argument to the execution command, is not included in the logical psets 436. Each of the logical psets 436 includes the project scope for its corresponding instance of the first sub-graph 202.

Referring to FIG. 7, the logical psets 436 are provided to a pset signature string computation step 442 which computes a different logical pset signature string 444 for each of the logical psets 436.

The logical pset signature strings 444 and a set of logical pset signature strings for the existing psets 447 in the repository of existing psets 448 are provided to a search step 446. As was the case in FIG. 2, there are three existing psets associated with the first sub-graph 202: one for the mexico FEED parameter, one for the usa FEED parameter, and one for the canada FEED parameter. Thus, the set of logical pset signature strings 444 for the existing psets 447 includes a string for each of the existing psets associated with the first sub-graph 202.

The search step 446 searches for the presence of each of the logical pset signature strings 444 in the set of logical pset signature strings for the existing psets 447. In this example, the result generated by the search step 446 is that the only logical pset signature string not included in the set of logical pset signatures strings for the existing psets 447 is the logical pset signature string associated with the logical pset with a FEED parameter value of 'hong kong.'

The result of the search step 446 and the logical pset 436 that includes the 'hong kong' feed parameter are provided to a logical pset addition step 450 which adds the logical pset which includes the FEED parameter of 'hong kong,' and its corresponding logical pset signature string 444 to the repository of existing logical psets 448.

By adding the new logical pset to the repository, a 'hong kong' instance of the first sub-graph 202, which would have been overlooked in previous data lineage results, will be represented in the data lineage results.

It is noted that while the static analysis values for run time parameters are described as being stored in the dataflow graphs themselves in the above examples, in some examples, the static analysis values for run time parameters can be maintained in one or more psets associated with the dataflow graphs.

In some examples, certain design time parameter values are derived from sources (e.g., from a database) that are not necessarily present at static analysis time. However, in some examples, the job log entries stored in the job log data store include values for all parameters that were resolved for that particular job. At static analysis time, the stored parameter values can be used in place of the parameter values derived from sources that are not present at static analysis time.

In some examples, the job log entries in the job log data store include all resolved parameters for a dataflow graph, a log of all files read and written by the dataflow graph, and performance tracking information. In some examples, the job log entries in the job log data store are augmented with any logical parameter sets that are discovered by the method of FIG. 4. In some examples, augmenting job log entries in the job log data store with discovered logical parameter sets includes forming an association between the job log entries and the discovered logical parameter sets. The augmented job log entries in the job log data store can be leveraged to provide various forms of information to a data architect or business user. In some examples, the augmented job log entries can be analyzed to ensure that dataflow graphs that are logically connected are also physically connected. In some examples, the augmented job log entries can be analyzed to determine which logical dataset instances a physical dataset corresponds to. In some examples, the augmented job log entries can be analyzed to identify datasets that have the same physical file name but are associated with different static analysis parameters. In such examples, the inconsistency can be presented to the user for manual repair or can be automatically repaired. In some examples, the data lineage report can include an indication of the inconsistency and whether or not it has been automatically repaired.

In some examples, the augmented job log entries can be used by the data lineage module to filter data lineage reports by frequency and/or recency. For example, the metadata environment module may maintain a number of dataflow graphs and psets that are no longer executed by the execution module. Such dataflow graphs and psets may be left in place just in case it is needed at a later time. However, the unexecuted dataflow graphs and psets can cause unnecessary clutter in data lineage reports. To reduce the clutter, the augmented job log entries can be analyzed to determine which dataflow graphs and/or psets are infrequently used and/or have not been recently used. Based on this frequency and recency information, infrequently and non-recently executed dataflow graphs and psets (e.g., a dataflow graph that hasn't run in the past year) can be filtered out of a data lineage report prior to presentation to an enterprise user.

In some examples, a logical pset for a given dataflow graph (e.g., a pset including FEED=USA) may exist, but one or more jobs that invoke the dataflow graph do so by directly supplying parameter values to the dataflow graph instead of utilizing the existing pset. In such cases, an association maintained between jobs and the logical psets that were accessed by the jobs (e.g., via signatures associated with the jobs) can be used to group job log entries based on their associated logical psets. Based on the grouping, any jobs that are instantiated by invoking a graph directly instead of utilizing an existing pset can be identified as being related to the logical pset and its parameters.

In some examples, each job log entry for a dataflow graph includes, among other information, a list of all resolved parameter values for the execution of the dataflow graph that is associated with the job log entry. Once a number of job log entries have accumulated, the resolved parameter values included in the job log entries can be compared to identify the various "design time instances" of the dataflow graph. For example, certain resolved parameters in the job log entries may be represented by only a few values in all of the job log entries, while certain other resolved parameters may be represented by many different values in all of the job log entries. Those resolved parameters that are represented by only a few values in the job log entries are likely "design time" parameters and the other resolved parameters that are represented by many different values in the job log entries are likely "run time parameters." Any instances of the dataflow graph that share a unique combination of "design time parameters" are grouped together and are considered to all be a "design time instance" of the dataflow graph. The data lineage module includes the different design time instances of the dataflow graph in the data lineage report.

5 Duplicate Logical Dataset Discovery and Mitigation Method 5.1 Overview

In general, input and output datasets (e.g., databases or tables of data) for a given dataflow graph are specified as logical datasets in the dataflow graph. In some examples, each logical dataset is associated with an identifier such as a logical file name.

Before the dataflow graph is executed, it is prepared for execution including resolving each logical dataset to a corresponding physical dataset (e.g., a file on disk). In some examples, each physical dataset is associated with an identifier such as a physical file name (e.g., "summary.dat"). The parameter resolution process is able to successfully resolve a logical dataset to its corresponding physical dataset even if the logical file name of the logical dataset differs from the physical file name of the corresponding physical dataset.

When a data lineage report is determined for a dataflow graph including two or more sub-graphs, the lineage relationships between the sub-graphs are at least in part determined according to the logical file names of the input and output logical datasets of the two or more sub-graphs. For this reason, the correctness of the lineage relationships requires that any input and output logical datasets of the two or more sub-graphs that refer to a given physical dataset share the same logical file name. Indeed, if a first sub-graph writes to a given physical dataset and a second sub-graph subsequently reads from the given physical dataset, but the logical file names of the output logical dataset of the first sub-graph and the input logical dataset of the second sub-graph do not match, no lineage relationship will be identified between the two sub-graphs. In some examples, two logical datasets that resolve to the same physical dataset but have non-matching logical file names are referred to as "duplicate logical datasets."

As is described in detail below, duplicate logical datasets in a dataflow graph can be identified and presented to a user. The user can then choose to address the duplicate logical datasets in a number of ways.

5.2 Example Without Duplicate Logical Datasets

Figure 8:
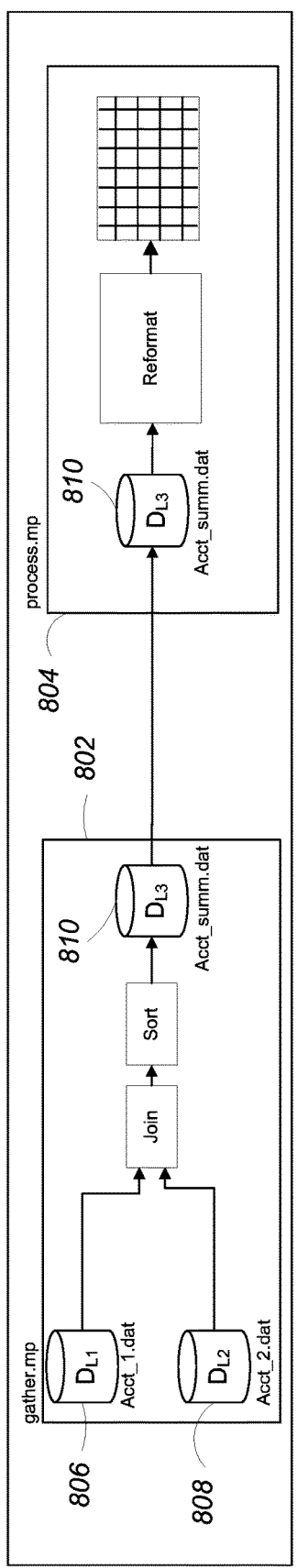
FIG. 8 is an example dataflow graph including a first sub-graph and second sub-graph.

Referring to FIG. 8 an example of a dataflow graph 817 generated using the development environment 118 of FIG. 1 includes a first sub-graph 802 named gather.mp and a second sub-graph 804 named process.mp.

The first sub-graph 802 receives a first logical dataset $D_{L1}$ 806 with a logical file name "Acct_1.dat" and a second logical dataset $D_{L2}$ 808 with a logical file name "Acct_2.dat" as input. The first sub-graph 802 processes the data from the first and second logical datasets 806, 808 and writes a result of the processing into a third logical dataset $D_{L3}$ 810 with a logical file name "Acct_summ.dat." The second sub-graph 804 receives the third logical dataset $D_{L3}$ 810 with a logical file name "Acct_summ.dat" as input, processes the data from the third logical dataset 810, and writes the result of the processing to a table 814. Note that both the third logical dataset 810, which is used by both the first sub-graph 802 and the second sub-graph 804 has the same logical file name in both of the sub-graphs 802, 804.

Figure 9:
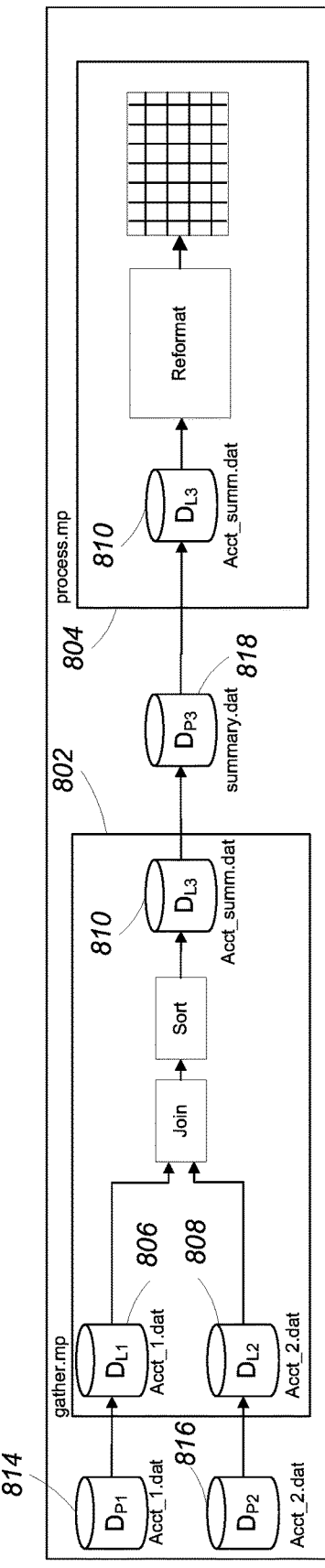
FIG. 9 shows the dataflow graph of FIG. 8 with its logical datasets resolved to physical datasets.

Referring to FIG. 9, when the dataflow graph 817 is resolved prior to execution, the logical datasets are resolved to their corresponding physical datasets. For example, the first logical dataset 806 is resolved to a first physical dataset, $D_{P1}$ 814 with a physical file name "Acct_1.dat," the second logical dataset 808 is resolved to a second physical dataset, $D_{P2}$ 816 with a physical file name "Acct_2.dat," the third logical dataset 810 is resolved to a third physical dataset, $D_{P3}$ 818 with a physical file name "summary.dat."

Figure 10:
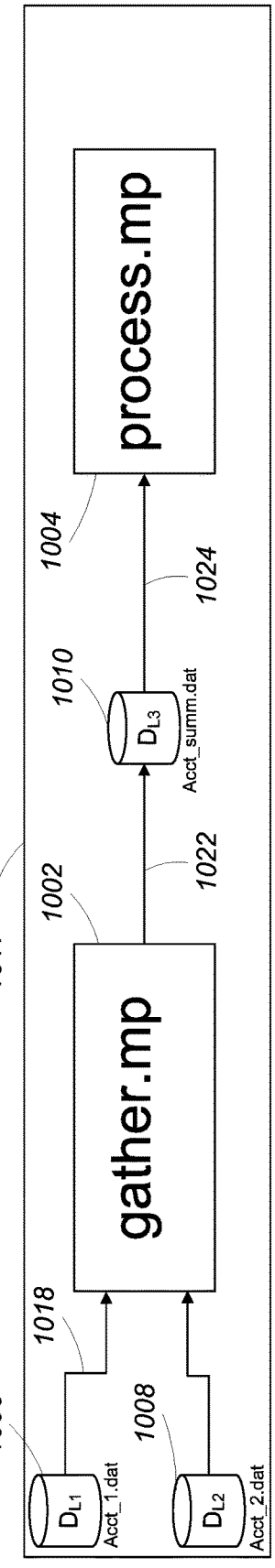
FIG. 10 shows a data lineage report for the dataflow graph of FIG. 8.

Referring to FIG. 10, a data lineage report 1017 for the dataflow graph includes the first sub-graph 1002, the second sub-graph 1004, the first logical dataset 1006, the second logical dataset 1008, and the third logical dataset 1010. The data lineage report 1017 also includes a first lineage relationship 1018 between the first logical dataset 1006 and an input of the first sub-graph 1002, a second lineage relationship 1020 between the second logical dataset 1008 and an input of the first sub-graph 1002, a third lineage relationship 1022 between an output of the first sub-graph 1002 and the third logical dataset 1010, and a fourth lineage relationship 1024 between the third logical dataset 1010 and the second sub-graph 1004. Note that data lineage report 1017 is correct in this case since the same logical dataset (i.e., the third logical dataset, $D_{L3}$ 810) with the same logical file name (i.e., "Acct_summ.dat") is present at the output of the first sub-graph 802 and at the input of the second sub-graph 804.

5.3 Example with Duplicate Logical Datasets

Referring to FIG. 11 another example of a dataflow graph 1117 generated using the development environment 118 of FIG. 1 includes a first sub-graph 1102 named gather.mp and a second sub-graph 1104 named process.mp.

The first sub-graph 1102 receives a first logical dataset $D_{L1}$ 1106 with a logical file name "Acct_1.dat" and a second logical dataset $D_{L2}$ 1108 with a logical file name "Acct_2.dat" as input. The first sub-graph 1102 processes the data from the first and second logical datasets 1106, 1108 and writes a result of the processing into a third logical dataset $D_{L3}$ 1110 with a logical file name "Acct_summ.dat." The second sub-graph 1104 receives, as in put a fourth logical dataset $D_{L4}$ 1111 with a logical file name "Acct-summ.dat" as input, processes the data from the fourth logical dataset 1111, and writes the result of the processing to a table 814. Note that the logical file name for the third logical dataset 1110 (i.e., "Acct_summ.dat") differs from the logical file name for the fourth logical dataset 1111 (i.e., "Acct-summ.dat").

Referring to FIG. 12, when the dataflow graph 1117 is resolved prior to execution, the logical datasets are resolved to their corresponding physical datasets. For example, the first logical dataset 1106 is resolved to a first physical dataset, $D_{P1}$ 1114 with a physical file name "Acct_1.dat," the second logical dataset 1108 is resolved to a second physical dataset, $D_{P2}$ 1116 with a physical file name "Acct_2.dat," and both the third logical dataset 1110 and the fourth logical dataset 1111 are resolved to a third physical dataset, $D_{P3}$ 1218 with a physical file name "summary.dat." Note that the third logical dataset 1110 and the fourth logical dataset 1111 are duplicate logical datasets since they each point to the same physical dataset (i.e., the third physical dataset 1218).

Referring to FIG. 13, a data lineage report 1317 for the dataflow graph includes the first sub-graph 1102, the second sub-graph 1104, the first logical dataset 1106, the second logical dataset 1108, the third logical dataset 1110, and the fourth logical dataset 1111. The data lineage report 1317 also includes a first lineage relationship 1318 between the first logical dataset 1106 and an input of the first sub-graph 1102, a second lineage relationship 1320 between the second logical dataset 1108 and an input of the first sub-graph 1102, a third lineage relationship 1322 between an output of the first sub-graph 1002 and the third logical dataset 1110, and a fourth lineage relationship 1324 between the fourth logical dataset 1111 and the second sub-graph 1104.

Note that the data lineage report 1317 is incorrect in this case since two different logical datasets (i.e., the third logical dataset 1110 and the fourth logical dataset 1111) with different logical file names refer to the same physical dataset (i.e., the third physical dataset 1218). In particular, the third logical dataset, $D_{L3}$ 1110 with the logical file name "Acct_summ.dat" is present at the output of the first sub-graph 1102 and the fourth logical dataset 1111 with the logical file name "Acct-summ.dat" is present at the input of the second sub-graph 1104. The data lineage report 1317 represents the third logical dataset 1110 and the fourth logical dataset 1111 as separate datasets without any lineage relationship with one another. As such, the data lineage report 1317 incorrectly includes a break in the data lineage between the third logical dataset 1110 and the fourth logical dataset 1111.

5.4 Duplicate Logical Dataset Discovery

In some examples, duplicate logical datasets in a dataflow graph can be discovered by analyzing run time artifacts (e.g., the job logs 429 of in FIG. 5) generated by executions of the dataflow graph. In particular, each time the dataflow graph is executed, a job log is generated.

The job log includes information associated with the execution of the dataflow graph including the graph instance name and, for each dataset component in a graph, the physical datasets it accessed and the type of access (read or write). Graph instances can be examined to determine logical dataset names for each dataset component. By matching on the graph instance and the dataset component name, the system is able to map logical dataset names to physical dataset names.

To identify duplicate logical datasets, the job logs are analyzed to identify any logical to physical dataset mappings in which the first logical dataset of the mapping differs from the second logical dataset of the mapping. Any logical to physical dataset mappings in which the first logical dataset and the second logical dataset differ are classified as duplicate logical datasets.

The identified duplicate logical datasets are either presented to a user who decides whether or not to correct the duplicate logical datasets or are automatically mitigated.

5.4.1 Example of Duplicate Logical Dataset Discovery

Referring again to FIG. 12, when the resolved dataflow graph 1117 executes, a job log for the dataflow graph execution is generated. The job log includes a single logical to physical dataset mapping corresponding to the flow between the first sub-graph 1102 and the second sub-graph 1104. The logical to physical dataset mapping includes an identifier for the third logical dataset, $D_{L3}$ 1110 at the output of the first sub-graph 1104, an identifier for the fourth logical dataset, $D_{L4}$ 1111 at the input of the second sub-graph 1106, and an identifier for the third physical dataset 1218.

Since the third logical dataset 1110 and the fourth logical dataset 1111 are distinct logical datasets (e.g., logical datasets with different logical file names) that point to the same physical dataset (i.e., the third physical dataset 1218), the third logical dataset 1110 and the fourth logical dataset 1111 are classified as duplicate logical datasets.

Note that while the simple example described above includes the identification of a single pair of duplicate logical datasets from a single job log, in an actual implementation of a data processing system that includes the above duplicate logical dataset discovery approaches, a number of pairs of duplicate logical datasets may be identified using a number of job logs.

5.5 Duplicate Logical Dataset Mitigation

As is noted above, duplicate logical datasets may result in breaks in data lineage reports. Once the duplicate logical datasets are identified, a number of different approaches can be taken to eliminate the duplicate logical datasets or to mitigate their effects on data lineage reports. In some examples, the identified duplicate logical datasets are presented to a user in, for example, a spreadsheet form. The user can then edit the dataflow graphs that include the duplicate logical datasets to eliminate the duplicate logical datasets (e.g., by ensuring that, in a given dataflow graph, a given physical dataset is referred to only by a single logical dataset). In other examples, the user can mark a pair of duplicate logical datasets as being equivalent. In this way, the user is not required to make any changes to the dataflow graphs. In yet other examples, pairs of duplicate logical datasets can be automatically marked as being equivalent.

Figure 14:
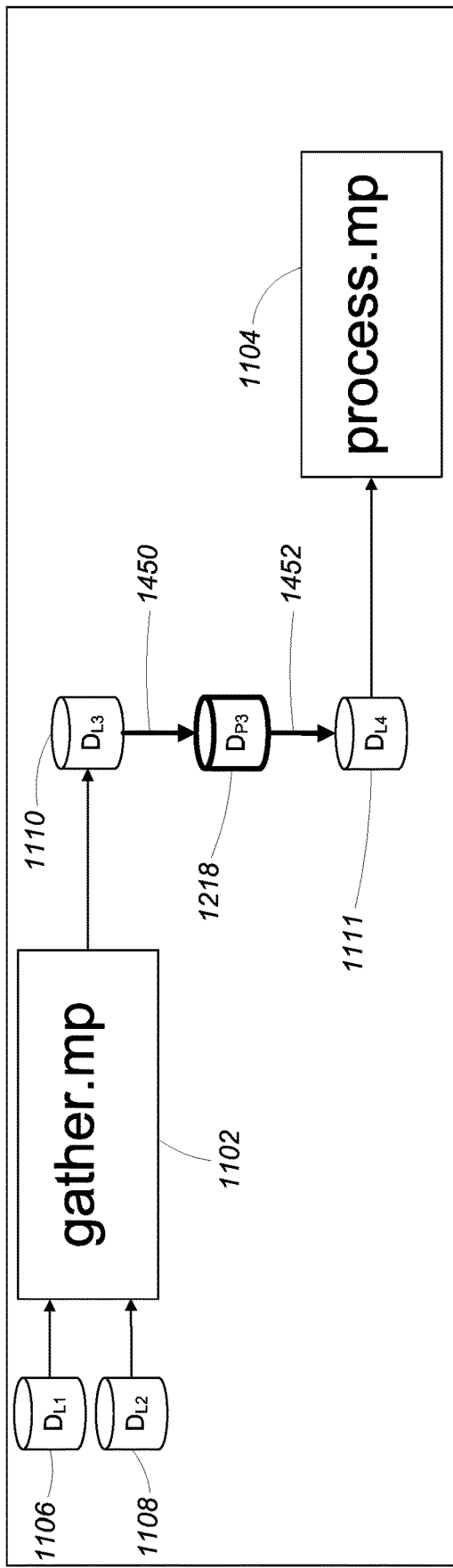
FIG. 14 shows a first technique for mitigating the effects of a data lineage break in a data lineage report.

When a pair of duplicate logical datasets are marked as being equivalent, there are a number of approaches to displaying the equivalency in a data lineage report. In one approach, the physical dataset that the pair of duplicate logical datasets refers to is shown connected to the duplicate logical datasets in the data lineage report. For example, referring to FIG. 14, the third physical dataset, $D_{P3}$ 1218 is included in the data lineage report 1317. Both the third logical dataset, $D_{L3}$ 1110 and the fourth logical dataset, $D_{L4}$ 1111 are shown as being connected to the third physical dataset 1218 by lineage relationships 1450 and 1452.

Figure 15:
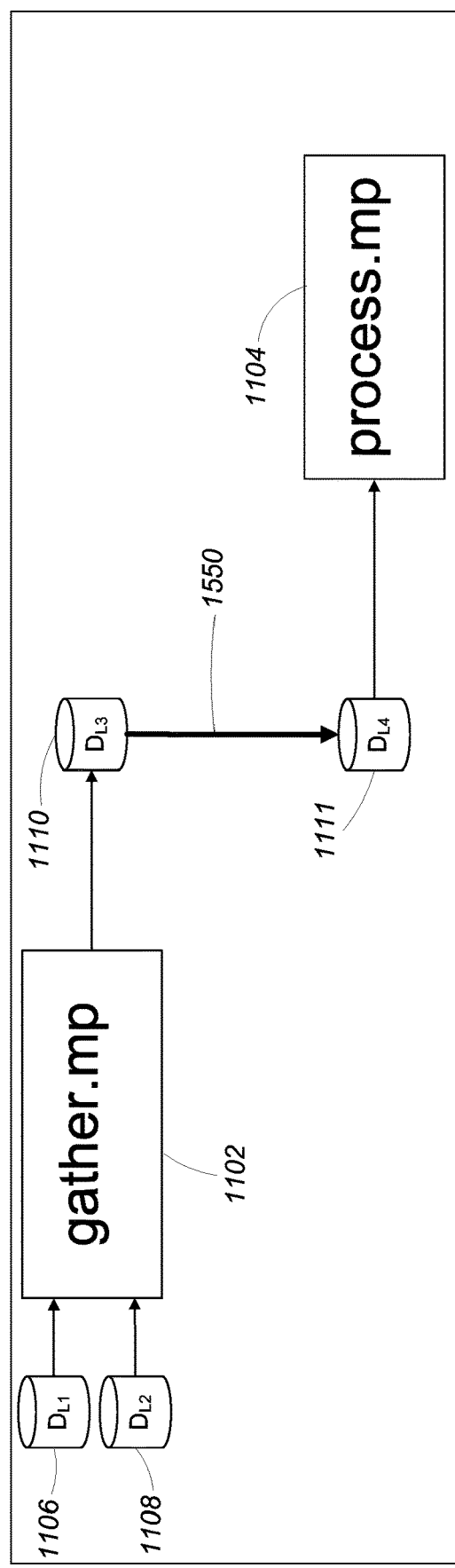
FIG. 15 shows a second technique for mitigating the effects of a data lineage break in a data lineage report.

In another approach, the logical datasets of the pair of duplicate logical datasets are shown connected to one another in the data lineage report by a lineage relationship. For example, referring to FIG. 15, the third logical dataset, $D_{L3}$ 1110 is shown as being connected to the fourth logical dataset, $D_{L4}$ 1111 by a lineage relationship 1550 in the data lineage report 1317.

Figure 16:
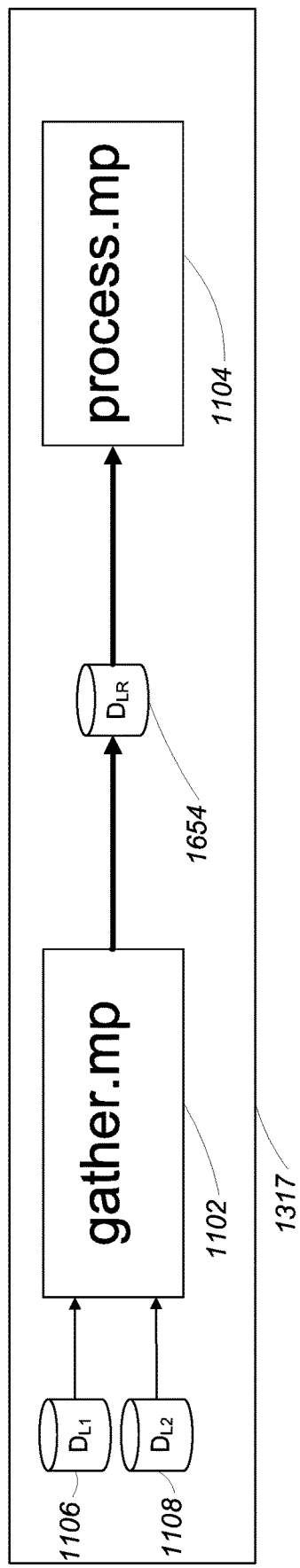
FIG. 16 shows a third technique for mitigating the effects of a data lineage break in a data lineage report.

In another approach, the pair of duplicate logical datasets is represented by a combined logical dataset in the data lineage report. For example, referring to FIG. 16, the pair of duplicate logical datasets is represented by a combined logical dataset, $D_{LR}$ 1654 in the data lineage report 1317.

Figure 17:
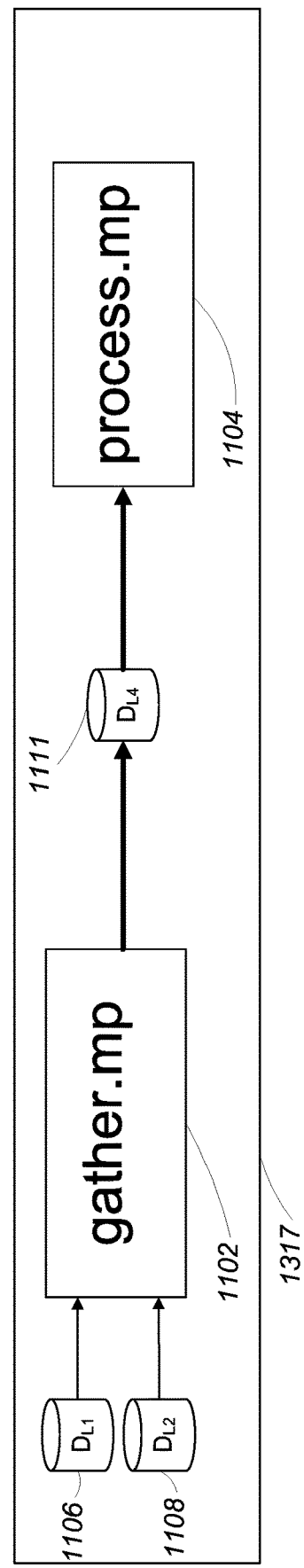
FIG. 17 shows a fourth technique for mitigating the effects of a data lineage break in a data lineage report.

In another approach, one logical dataset of the pair of duplicate logical datasets is chosen to represent the pair of duplicate logical datasets in the data lineage report. For example, referring to FIG. 17, the fourth logical dataset, $D_{L4}$ 1111 represents the pair of duplicate logical datasets in the data lineage report 1317.

Figure 18:
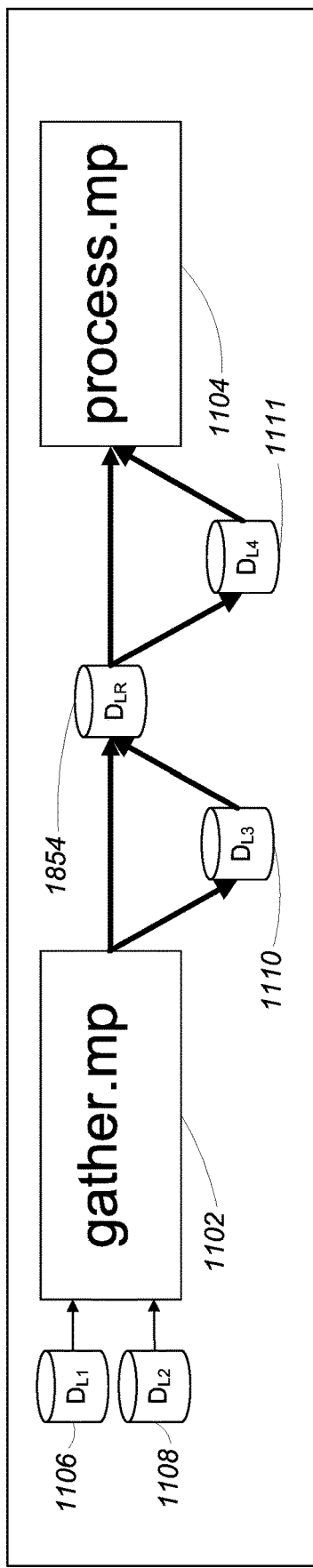
FIG. 18 shows a fifth technique for mitigating the effects of a data lineage break in a data lineage report.

In another approach, the pair of duplicate logical datasets and a combined logical dataset representation of the pair of duplicate logical datasets are included in the data lineage report. A unique configuration of lineage relationships between pair of duplicate logical datasets and the combined logical dataset representation is shown in the data lineage graph. For example, referring to FIG. 18, the data lineage report 1317 includes a combined logical dataset representation of the pair of duplicate logical datasets, $D_{LR}$, 1854, the third logical dataset, $D_{L3}$ 1110, and the fourth logical dataset, $D_{L4}$ 1111. The combined logical dataset 1854 is shown as having direct lineage relationships with the first sub-graph 1102 and the second sub-graph 1104. The combined logical dataset 1845 is also shown as having an indirect lineage relationship with the first sub-graph 1102 via the third logical dataset 1110 and as having an indirect lineage relationship with the second sub-graph 1104 via the fourth logical dataset 1111.

Figure 19:
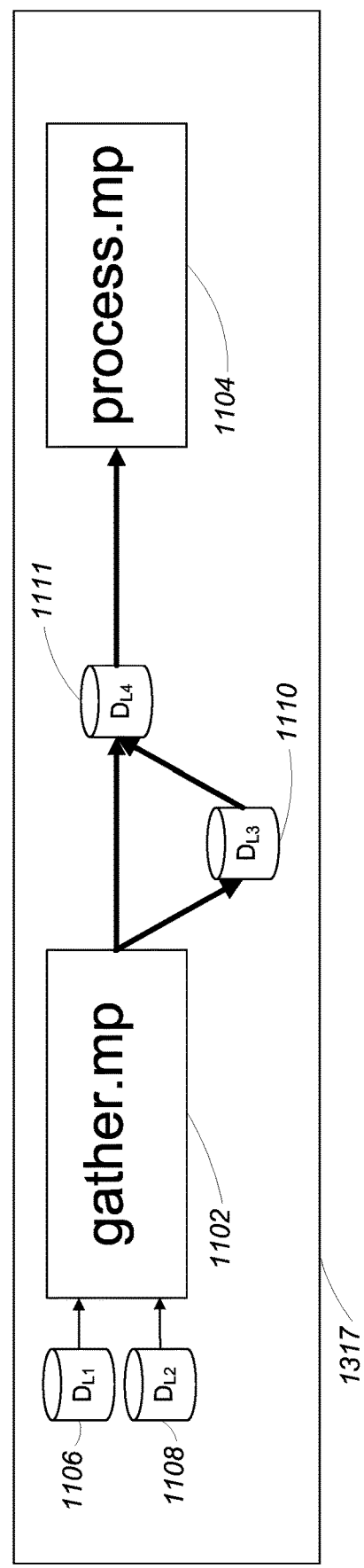
FIG. 19 shows a sixth technique for mitigating the effects of a data lineage break in a data lineage report.

In another approach, the logical datasets of the pair of duplicate logical datasets are included in the data lineage report. A unique configuration of lineage relationships between the logical datasets of the pair of duplicate logical datasets is shown in the data lineage graph. For example, referring to FIG. 19, the data lineage report 1317 includes the third logical dataset, $D_{L3}$ 1110 and the fourth logical dataset, $D_{L4}$ 1111. The fourth logical dataset 1111 is shown as having direct lineage relationships with the first sub-graph 1102 and the second sub-graph 1104. The third logical dataset, $D_{L3}$ 1110 is shown as having a direct lineage relationship with the first sub-graph 1102 and as having an indirect lineage relationship with the second sub-graph 1104 via the fourth logical dataset 1111.

Note that, in some examples, the mitigation approaches described above are shown in data lineage reports in dashed lines, bold lines, or in another alternative fashion such that it is clear to a user of the data lineage report that a mitigation approach has been applied to the data lineage report.

It is noted that, while the above duplicate logical dataset discovery and mitigation approaches are described using a scenario where a first component writes to a physical dataset and another component reads from that physical dataset, other scenarios can result in duplicate logical datasets. For example, a pair of duplicate logical datasets can result from two different logical datasets reading from the same physical dataset.

Similarly, a pair of duplicate logical datasets can result from two different logical datasets writing to the same physical dataset.

The approaches described above can incorporate features from a variety of other approaches for managing and presenting data lineage information and for managing dataset objects, as described in more detail in U.S. application Ser. No. 12/393,765, filed on Feb. 26, 2009, U.S. application Ser. No. 13/281,039, filed on Oct. 25, 2011, and U.S. Provisional Application Ser. No. 62/028,485, filed on Jul. 24, 2014, all of which are incorporated herein by reference.

The approaches described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for managing sets of parameter values, the method including:
   receiving a generic computer program;
   receiving a first set of parameter values;
   generating an executable instance of the generic computer program by instantiating the generic computer program according to the first set of parameter values;
   receiving data from one or more data sets;
   executing the executable instance of the generic computer program to process at least some of the received data;
   generating a log entry for the executable instance of the generic computer program, the log entry including at least some of the parameter values of the first set of parameter values;
   storing the log entry in a log data structure;
   receiving the log entry, including retrieving the stored log entry from the log data structure;
   processing the received log entry to form a particular set of parameter values, wherein the processing includes extracting the at least some of the parameter values of the first set of parameter values from the log entry and forming the particular set of parameter values from the extracted at least some of the parameter values; and
   determining whether to add the particular set of parameter values to a plurality of preexisting sets of parameter values based on a comparison of the particular set of parameter values to at least some sets of parameter values of the plurality of preexisting sets of parameter values, wherein the preexisting sets of parameter values represent data lineage relationships between inputs and outputs of a plurality of computer programs.

2. The method of claim 1 wherein the comparison includes comparing a first identifier for the particular set of parameter values to identifiers for the at least some of the preexisting sets of parameter values of the plurality of preexisting sets of parameter values including:
   determining the first identifier based on the particular set of parameter values and an identifier of the generic computer program;
   determining a plurality of second identifiers, one for each preexisting set of parameter values of the at least some of the preexisting sets of parameter values; and
   comparing the first identifier to each second identifier of the plurality of second identifiers to determine whether the first identifier and any of the second identifiers match.

3. The method of claim 2 wherein determining whether to add the particular set of parameter values to the plurality of preexisting sets of parameter values includes determining to add the particular set of parameter values to the plurality of preexisting sets of parameter values if none of the second identifiers match the first identifier.

4. The method of claim 2 wherein determining the first identifier includes computing an identification string from contents of the particular set of parameter values, and determining the second identifiers includes computing identification strings from the contents of the at least some of the preexisting sets of parameter values of the plurality of preexisting sets of parameter values.

5. The method of claim 2 wherein determining the first identifier includes forming a concatenation of one or more of the identifier of the generic computer program, name-value pairs of the particular set of parameter values, a function prototype of the generic computer program, and a project scope for the executable instance of the generic computer program.

6. The method of claim 2 wherein determining the first identifier includes applying a data mapping function to one or more of the identifier of the generic computer program, name-value pairs of the particular set of parameter values, a function prototype of the generic computer program, and a project scope for the executable instance of the generic computer program.

7. The method of claim 6 wherein the data mapping function includes a hash function.

8. The method of claim 1 further including analyzing the generic computer program to classify each of one or more parameters associated with the generic computer program as a member of either a first class of parameters or a second class of parameters.

9. The method of claim 8 wherein processing the log entry to form the particular set of parameter values further includes:
   including, in the particular set, any extracted parameter values occurring in the log entry and classified as members of the first class, and
   excluding, from the particular set, any extracted parameter values occurring in the log entry and classified as members of the second class.

10. The method of claim 8 wherein, for each of the parameter one or more parameters, the analyzing includes either automatically classifying the parameter or accepting a user-defined classification for the parameter.

11. The method of claim 10 wherein automatically classifying the parameter includes initially classifying the parameter as belonging to the first class of parameters, determining a number of unique values of the parameter in a plurality of executions of instances of the generic computer program, and re-classifying the parameter as belonging to the second class of parameters if the number of unique values of the parameter exceeds a predetermined threshold.

12. The method of claim 10 wherein automatically classifying the parameter includes initially classifying the parameter as belonging to the first class of parameters, determining whether or not changes in values of the parameter in a plurality of executions of instances of the generic computer program affect data lineage associated with the generic computer program, and re-classifying the parameter as belonging to the second class of parameters if changes in values of the parameter do not affect the data lineage.

13. The method of claim 8 wherein the first class of parameters includes parameters that affect a logical operation of the generic computer program and the second class of parameters includes parameters that do not affect the logical operation of the generic computer program.

14. The method of claim 1 wherein the generic computer program is specified as a dataflow graph that includes nodes representing data processing operations and links between the nodes representing flows of data elements between the data processing operations.

15. The method of claim 1 further including forming an association between the log entry and the particular set of parameter values.

16. The method of claim 1 wherein the log entry includes a log entry of an execution command used to instantiate the executable instance of the generic computer program including one or more parameter values supplied as arguments to the execution command.

17. The method of claim 16 wherein the log entry further includes one or more of an indication of a project that the executable instance executed in, an indication of internal parameters for the executable instance, and an indication of environmental settings, global variables, and configuration variables used by the executable instance.

18. The method of claim 1 further including processing an overall plurality of sets of parameter values for a plurality of generic computer programs and an overall plurality of log entries associated with executions of instances of at least some of the plurality of generic computer programs to form a data lineage report, wherein the overall plurality of sets of parameter values includes the particular set of parameter values, and the overall plurality of log entries associated with executions of instances of the at least some of the plurality of generic computer programs includes the log entry for the execution of the executed instance of the generic computer program, including an association of the executed instance of the generic computer program with the particular set of parameter values.

19. The method of claim 18, wherein the forming of the data lineage report includes, for each set of parameter values of the overall plurality of sets of parameter values for the plurality of generic computer programs,
   processing the overall plurality of log entries associated with executions of instances of the at least some of the plurality of generic computer programs to identify all log entries associated with executions of instances of the generic computer program corresponding to the set of parameter values, and identifying a most recent time of instantiation of the generic computer program from the identified log entries associated with executions of instances of the generic computer program; and
   determining whether to include each set of parameter values of the overall plurality of set of parameter values in the data lineage report based on the most recent time of instantiation of the generic computer program.

20. The method of claim 19 wherein the determining whether to include each set of parameter values of the overall plurality of set of parameter values in the data lineage report based on the most recent time of instantiation of the generic computer program includes comparing the most recent time of instantiation to a predetermined time interval and including each set of parameter values of the overall plurality of set of parameter values in the data lineage report if the most recent time of instantiation of the generic computer program is within the predetermined time interval.

21. The method of claim 18 wherein the forming of the data lineage report includes, for each set of parameter values of the overall plurality of sets of parameter values for the plurality of generic computer programs, processing the overall plurality of log entries associated with executions of instances of the at least some of the plurality of generic computer programs to determine a number of log entries associated with executions of instances of the generic computer program corresponding to each set of parameter values of the overall plurality of set of parameter values, and determining whether to include each set of parameter values of the overall plurality of set of parameter values in the data lineage report based on the number of log entries associated with executions of instances of the generic computer program.

22. The method of claim 1 wherein the generic computer program is associated with one or more parameters, and values of at least some of the one or more parameters affecting a data linage relationship arising from execution of the executable instance of the generic computer program.

23. The method of claim 1 wherein the log data structure is embodied on a data storage device.

24. The method of claim 23 wherein the data storage device includes a disk drive and the log data structure includes a file system in which the log entry is stored as a file.

25. The method of claim 1 wherein the instantiating the generic computer program according to the first set of parameter values includes configuring program execution of the generic computer program according to the first set of parameter values.

26. The method of claim 1 wherein forming the particular set of parameter values includes processing the log entry to form associations of parameter names and respective parameter values.

27. The method of claim 1 further comprising providing the particular set of parameter values as a record of the at some of the parameter values used to generate the executable instance of the generic computer program.

28. The method of claim 1 wherein the plurality of preexisting sets of parameter values is separate from the log data structure.

29. Software stored in a non-transitory form on a computer-readable medium, for managing sets of parameter values, the software including instructions that when executed by a processor cause a computing system to:
   receive a generic computer program;
   receive a first set of parameter values;
   generate an executable instance of the generic computer program by instantiating the generic computer program according to the first set of parameter values;
   receive data from one or more data sets;
   execute the executable instance of the generic computer program to process at least some of the received data;
   generate a log entry for the executable instance of the generic computer program, the log entry including at least some of the parameter values of the first set of parameter values;
   store the log entry in a log data structure;
   receive the log entry, including retrieving the stored log entry from the log data structure;
   process the received log entry to form a particular set of parameter values, wherein the processing includes extracting the at least some of the parameter values of the first set of parameter values from the log entry and forming the particular set of parameter values from the extracted at least some of the parameter values; and
   determine whether to add the particular set of parameter values to a plurality of preexisting sets of parameter values based on a comparison of the particular set of parameter values to at least some of the preexisting sets of parameter values of the plurality of preexisting sets of parameter values, wherein the preexisting sets of parameter values represent data lineage relationships between inputs and outputs of a plurality of computer programs.

30. A system for managing sets of parameter values, the system including:
   a first computing system including
      a first input device or port for receiving a generic computer program, a first set of parameter values, and data from one or more data sets;

a first set of one or more processors configured to:
  generate an executable instance of the generic computer program by instantiating the generic computer program according to the first set of parameter values;
  execute the executable instance of the generic computer program to process at least some of the received data;
  generate a log entry for the executable instance of the generic computer program, the log entry including at least some of the parameter values of the first set of parameter values;
a first output device or port for storing the log entry in a log data structure of a storage device;
a second computing system including
  a second input device or port for receiving the log entry, including retrieving the stored log entry from the log data structure;
  a second set of one or more processors configured to:
    process the received log entry to form a particular set of parameter values, wherein the processing includes extracting the at least some of the parameter values of the first set of parameter values from the log entry and forming the particular set of parameter values from the extracted at least some of the parameter values; and
    determine whether to add the particular set of parameter values to a plurality of preexisting sets of parameter values based on a comparison of the particular set of parameter values to at least some of the preexisting sets of parameter values of the plurality of preexisting sets of parameter values, wherein the preexisting sets of parameter values represent data lineage relationships between inputs and outputs of a plurality of computer programs.

31. A system for managing sets of parameter values, the system including:
  means for receiving a generic computer program; means for receiving a first set of parameter values;
  means for generating an executable instance of the generic computer program by instantiating the generic computer program according to the first set of parameter values;
  means for receiving data from one or more data sets; means for executing the executable instance of the generic computer program to process at least some of the received data;
  means for generating a log entry for the executable instance of the generic computer program, the log entry including at least some of the parameter values of the first set of parameter values;
  means for storing the log entry in a log data structure;
  means for receiving the log entry, including retrieving the stored log entry from the log data structure;
  means for processing the received log entry to form a particular set of parameter values, wherein the processing includes extracting the at least some of the parameter values of the first set of parameter values from the log entry and forming the particular set of parameter values from the extracted at least some of the parameter values; and
  means for determining whether to add the particular set of parameter values to a plurality of preexisting sets of parameter values based on a comparison of the particular set of parameter values to at least some sets of parameter values of the plurality of preexisting sets of parameter values, wherein the preexisting sets of parameter values represent data lineage relationships between inputs and outputs of a plurality of computer programs.

\* \* \* \* \*